US012571746B2

(12) United States Patent
Liu et al.

(10) Patent No.: US 12,571,746 B2
(45) Date of Patent: Mar. 10, 2026

(54) APPARATUS AND METHOD FOR X-RAY FLUORESCENCE IMAGING

(71) Applicant: SHENZHEN XPECTVISION TECHNOLOGY CO., LTD., Guangdong (CN)

(72) Inventors: Yurun Liu, Guangdong (CN); Peiyan Cao, Guangdong (CN)

(73) Assignee: SHENZHEN XPECTVISION TECHNOLOGY CO., LTD., Guangdong (CN)

( * ) Notice: Subject to any disclaimer, the term of this patent is extended or adjusted under 35 U.S.C. 154(b) by 205 days.

(21) Appl. No.: 18/652,757

(22) Filed: May 1, 2024

(65) Prior Publication Data

US 2024/0280519 A1 Aug. 22, 2024

Related U.S. Application Data

(63) Continuation of application No. PCT/CN2021/129191, filed on Nov. 8, 2021.

(51) Int. Cl.
*G01N 23/223* (2006.01)
*G01N 23/2204* (2018.01)

(52) U.S. Cl.
CPC ....... *G01N 23/223* (2013.01); *G01N 23/2204* (2013.01); *G01N 2223/316* (2013.01); *G01N 2223/41* (2013.01)

(58) Field of Classification Search
CPC ... A61B 6/4233; A61B 6/4241; A61B 6/4291; G21K 4/00; G01N 23/223;
(Continued)

(56) References Cited

U.S. PATENT DOCUMENTS 10,466,185 B2    11/2019   Yun et al.
2004/0092807 A1   5/2004   Breskin et al.
(Continued)

FOREIGN PATENT DOCUMENTS

CN        1756508        4/2006
CN        103767726       5/2014
(Continued)

OTHER PUBLICATIONS

"Office Action of Taiwan Counterpart Application", issued on May 9, 2023, p1-p11.
(Continued)

*Primary Examiner* — Don K Wong
(74) *Attorney, Agent, or Firm* — JC ONE WORLD

(57) ABSTRACT

Apparatuses and methods of X-ray fluorescence (XRF) imaging use a radiation source to stimulate XRF from only a slice of an object by projecting a radiation beam through only the slice. An X-ray detector having a plurality of pixels is provided. A collimator having a plurality of parallel collimator plates is positioned between the object and the X-ray detector. The radiation beam is not parallel to the collimator plates. Neighboring pairs of the collimator plates allow XRF from only respective portions of the slice to reach respective subsets of the pixels. For each of the respective pixel subsets the X-ray detector sums signals generated in the pixel or pixels of the respective subset. The radiation beam is a fan beam or a pencil beam. A pixel pitch of the X-ray detector is an integer multiple of a plate pitch of the collimator.

20 Claims, 24 Drawing Sheets

(58) Field of Classification Search
CPC ..... G01N 2223/076; G01N 2021/8472; G01N 23/00; G01N 23/20; G01N 2223/316; G01T 1/28
See application file for complete search history.

(56)                  References Cited

U.S. PATENT DOCUMENTS

| | | |
|---|---|---|
| 2006/0182217 A1 | 8/2006 | Harding et al. |
| 2008/0226025 A1 | 9/2008 | Harding et al. |
| 2018/0003652 A1 | 1/2018 | Uher et al. |
| 2019/0094391 A1 | 3/2019 | Nishihara et al. |
| 2021/0080408 A1 | 3/2021 | Yun et al. |
| 2023/0280292 A1* | 9/2023 | Cao .................. G01N 33/54373 |
| | | 378/44 |

FOREIGN PATENT DOCUMENTS

| | | |
|---|---|---|
| CN | 112461877 | 3/2021 |
| CN | 113349817 | 9/2021 |
| JP | 2010025711 | 2/2010 |
| TW | 499566 | 8/2002 |
| WO | 2008068044 | 6/2008 |
| WO | 2014039793 | 3/2014 |

OTHER PUBLICATIONS

"International Search Report (Form PCT/ISA/210) of PCT/CN2021/129191," mailed on Jul. 27, 2022, pp. 1-2.
"Search Report of Europe Counterpart Application", issued on Nov. 6, 2024, p. 1-p. 8.

* cited by examiner

100

APPARATUS AND METHOD FOR X-RAY FLUORESCENCE IMAGING

CROSS-REFERENCE TO RELATED APPLICATION

This application is a continuation of International Patent Application of PCT application serial No. PCT/CN2021/129191, filed on Nov. 8, 2021. The content of the aforementioned applications, including any intervening amendments thereto, are incorporated herein by reference.

TECHNICAL FIELD

The disclosure herein relates to a detector suitable for X-ray fluorescence, and more particularly to an apparatus and method for X-ray fluorescence imaging.

BACKGROUND

X-ray fluorescence (XRF) is the emission of characteristic fluorescent X-rays from a material that has been excited by, for example, exposure to high-energy X-rays or gamma rays. An electron on an inner orbital of an atom may be ejected, leaving a vacancy on the inner orbital, if the atom is exposed to X-rays or gamma rays with photon energy greater than the ionization potential of the electron. When an electron on an outer orbital of the atom relaxes to fill the vacancy on the inner orbital, an X-ray (fluorescent X-ray or secondary X-ray) is emitted. The emitted X-ray has a photon energy equal to the energy difference between the outer orbital and inner orbital electrons.

For a given atom, the number of possible relaxations is limited. As shown in FIG. 1A, when an electron on the L orbital relaxes to fill a vacancy on the K orbital (L→K), the fluorescent X-ray is called Kα. The fluorescent X-ray from M→K relaxation is called KB. As shown in FIG. 1B, the fluorescent X-ray from M→L relaxation is called La, and so on.

Analyzing the fluorescent X-ray spectrum can identify the elements in a sample because each element has orbitals of characteristic energy. The fluorescent X-ray can be analyzed either by sorting the energies of the photons (energy-dispersive analysis) or by separating the wavelengths of the fluorescent X-ray (wavelength-dispersive analysis). The intensity of each characteristic energy peak is directly related to the amount of each element in the sample.

Proportional counters or various types of solid-state detectors (PIN diode, Si(Li), Ge(Li), Silicon Drift Detector SDD) may be used in energy dispersive analysis. These detectors are based on the same principle: an incoming X-ray photon ionizes a large number of detector atoms with the amount of charge carriers produced being proportional to the energy of the incoming X-ray photon. The charge carriers are collected and counted to determine the energy of the incoming X-ray photon and the process repeats itself for the next incoming X-ray photon. After detection of many X-ray photons, a spectrum may be compiled by counting the number of X-ray photons as a function of their energy. The speed of these detectors is limited because the charge carriers generated by one incoming X-ray photon must be collected before the next incoming X-ray hits the detector.

Wavelength dispersive analysis typically uses a photomultiplier. The X-ray photons of a single wavelength are selected from the incoming X-ray by a monochromator and are passed into the photomultiplier. The photomultiplier counts individual X-ray photons as they pass through. The counter is a chamber containing a gas that is ionizable by X-ray photons. A central electrode is charged at (typically)+ 1700 V with respect to the conducting chamber walls, and each X-ray photon triggers a pulse-like cascade of current across this field. The signal is amplified and transformed into an accumulating digital count. These counts are used to determine the intensity of the X-ray at the single wavelength selected.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an apparatus. The apparatus also includes a radiation source configured to stimulate X-ray fluorescence from only a slice of an object by projecting a radiation beam through only the slice. The apparatus also includes an X-ray detector having a plurality of pixels. The apparatus also includes a collimator having a plurality of parallel collimator plates, where the radiation beam is not parallel to the collimator plates. The apparatus also includes aspects where neighboring pairs of the collimator plates allow fluorescent X-ray from only respective portions of the slice to reach respective subsets of the pixels. The apparatus also includes aspects where, for each of the respective pixel subsets the X-ray detector is configured to sum signals generated in the pixel or pixels of the respective subset. Other embodiments of these aspects include corresponding computer systems, apparatus, and computer programs recorded on one or more computer storage devices, each configured to perform the actions of the methods.

Implementations may include one or more of the following features. In the apparatus, the slice has a lateral size narrower than the object. The slice has a vertical size taller than or equal to the object. The slice has a height shorter than the object. The radiation beam is an X-ray beam or a gamma ray beam. The parallel collimator plates are spaced apart uniformly, the spacing of the parallel collimator plates being characterized by a plate pitch, and the pixels are spaced apart uniformly, the spacing of the pixels being characterized by a pixel pitch that is an integer multiple of the plate pitch. Each pixel of the plurality of pixels is configured to count numbers of X-ray photons incident thereon. Each pixel is further configured to count numbers of the X-ray photons incident thereon whose energy falls in a plurality of bins, within a period of time; and the apparatus is configured to add the numbers of X-ray photons for the bins of the same energy range. The apparatus may include: a specimen fixture to hold the object. The specimen fixture is substantially transparent to the radiation beam. The specimen fixture is substantially transparent to XRF. The parallel collimator plates contain at least one element that absorbs X-ray. The parallel collimator plates contain at least one element from among the group may include of lead, tungsten, and gold. The collimator further includes a filler that fills all or part of at least one gap between the parallel collimator plates, and the filler is substantially transparent to X-ray. Implementations of the described techniques may include hardware, a method or process, or computer software on a computer-accessible medium.

One general aspect includes an X-ray fluorescence imaging method. The X-ray fluorescence imaging method also includes providing an X-ray detector having a plurality of pixels. The method also includes projecting a radiation beam through a slice of an object to stimulate XRF from the slice. The method also includes allowing XRF from only respective portions of the slice to reach respective subsets of the pixels by providing between the object and the X-ray detector a collimator having a plurality of parallel plates not parallel to the radiation beam, where each pixel of each subset of pixels is aligned to receive XRF between only one neighboring pair of the parallel plates. The method also includes counting numbers of XRF photons incident on each pixel of the X-ray detector. Other embodiments of this aspect include corresponding computer systems, apparatus, and computer programs recorded on one or more computer storage devices, each configured to perform the actions of the methods.

Implementations may include one or more of the following features. The method may include: counting numbers of the XRF photons incident on each pixel whose energy falls in a plurality of bins, within a period of time; and adding the numbers of XRF photons for the bins of the same energy range. The method may include: resolving an image of the object in a first direction orthogonal to a primary axis of the radiation beam based on a size of the slice in the first direction; and resolving the image of the object in a second direction orthogonal to the primary axis and orthogonal to the first direction based on a size of a gap between neighboring pairs of the parallel plates. The method may include: resolving the image of the object in a third direction orthogonal to the primary axis and orthogonal to the first and second directions based on a size of the slice in the third direction. The method may include: projecting the radiation beam through a first slice of the object; counting the numbers of XRF photons incident on each pixel of the X-ray detector from the first slice; projecting the radiation beam through a second slice different from the first slice; and counting the numbers of XRF photons incident on each pixel of the X-ray detector from the second slice. The object is stationary, and the radiation beam is moved. The radiation beam is stationary, and the object is moved. The method may include: moving the radiation beam in a first scanning direction from a first position where the radiation beam projects through the first slice to a second position where the radiation beam projects through the second slice. The moving the radiation beam includes translating the radiation beam. The moving the radiation beam includes rotating the radiation beam. Implementations of the described techniques may include hardware, a method or process, or computer software on a computer-accessible medium.

According to an embodiment, a detector includes: a plurality of pixels, each pixel configured to count numbers of X-ray photons incident thereon whose energy falls in a plurality of bins, within a period of time; and wherein the detector is configured to add the numbers of X-ray photons for the bins of the same energy range counted by all the pixels.

According to an embodiment, the detector is further configured to compile the added numbers as a spectrum of the X-ray photons incident on the detector.

According to an embodiment, the plurality of pixels area arranged in an array.

According to an embodiment, the pixels are configured to count the numbers of X-ray photons within a same period of time.

According to an embodiment, each of the pixels comprises an analog-to-digital converter (ADC) configured to digitize an analog signal representing the energy of an incident X-ray photon into a digital signal.

According to an embodiment, the pixels are configured to operate in parallel.

According to an embodiment, each of the pixels is configured to measure its dark current.

According to an embodiment, each of the pixels is configured to measure its dark current before or concurrently with each X-ray photon incident thereon.

According to an embodiment, each of the pixels is configured to deduct a contribution of the dark current from the energy of an X-ray photon incident thereon.

According to an embodiment, each of the pixels is configured to measure its dark current by measuring a time it takes for a voltage to increase by a threshold.

According to an embodiment, the ADC is a successive-approximation-register (SAR) ADC.

According to an embodiment, the detector further comprises: an X-ray absorption layer comprising an electric contact; a first voltage comparator configured to compare a voltage of the electric contact to a first threshold; a second voltage comparator configured to compare the voltage to a second threshold; a controller; a plurality of counters each associated with a bin and configured to register a number of X-ray photons absorbed by one of the pixels wherein the energy of the X-ray photons falls in the bin; wherein the controller is configured to start a time delay from a time at which the first voltage comparator determines that an absolute value of the voltage equals or exceeds an absolute value of the first threshold; wherein the controller is configured to determine whether an energy of an X-ray photon falls into the bin; wherein the controller is configured to cause the number registered by the counter associated with the bin to increase by one.

According to an embodiment, the detector further comprises a capacitor module electrically connected to the electric contact, wherein the capacitor module is configured to collect charge carriers from the electric contact.

According to an embodiment, the controller is configured to activate the second voltage comparator at a beginning or expiration of the time delay.

According to an embodiment, the controller is configured to connect the electric contact to an electrical ground.

According to an embodiment, a rate of change of the voltage is substantially zero at expiration of the time delay.

According to an embodiment, the X-ray absorption layer comprises a diode.

According to an embodiment, the X-ray absorption layer comprises silicon, germanium, GaAs, CdTe, CdZnTe, or a combination thereof.

According to an embodiment, the apparatus does not comprise a scintillator.

Disclosed herein is a method for measuring an energy spectrum of X-ray, comprising: exposing a detector with a plurality of pixels to X-ray; determining a number of X-ray photons for each pixel for one of a plurality of bins, wherein energy of the X-ray photon falls in the one bin; adding the numbers for the bins of a same energy range of all the pixels.

According to an embodiment, determining the number comprises subtracting a contribution of dark current in the each pixel.

According to an embodiment, determining the number comprises analog-to-digital conversion.

BRIEF DESCRIPTION OF THE DRAWINGS

In order to explain embodiments of the present disclosure or the prior art more clearly, drawings used in the description of the embodiments or the prior art will be briefly explained below. Obviously, the following drawings are merely for exemplary and explanatory purposes. It is understood by those skilled in the art that without paying any creative efforts, other drawings are available based on the following drawings.

DETAILED DESCRIPTION OF DISCLOSURED EMBODIMENTS

Figure 1A:
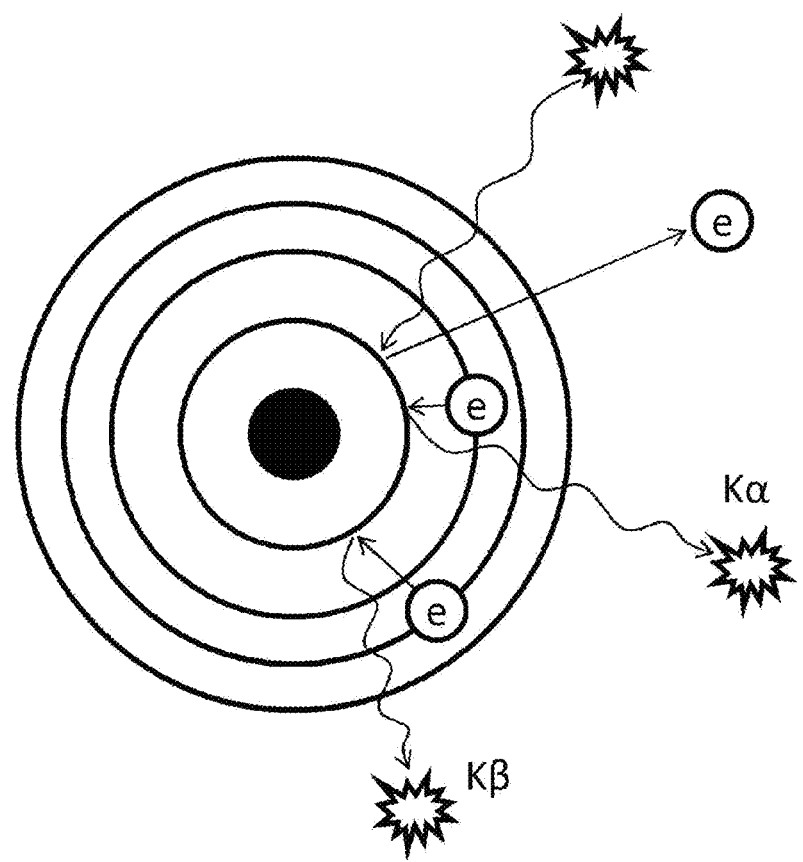
FIG. 1A schematically shows mechanisms of XRF.
Figure 1B:
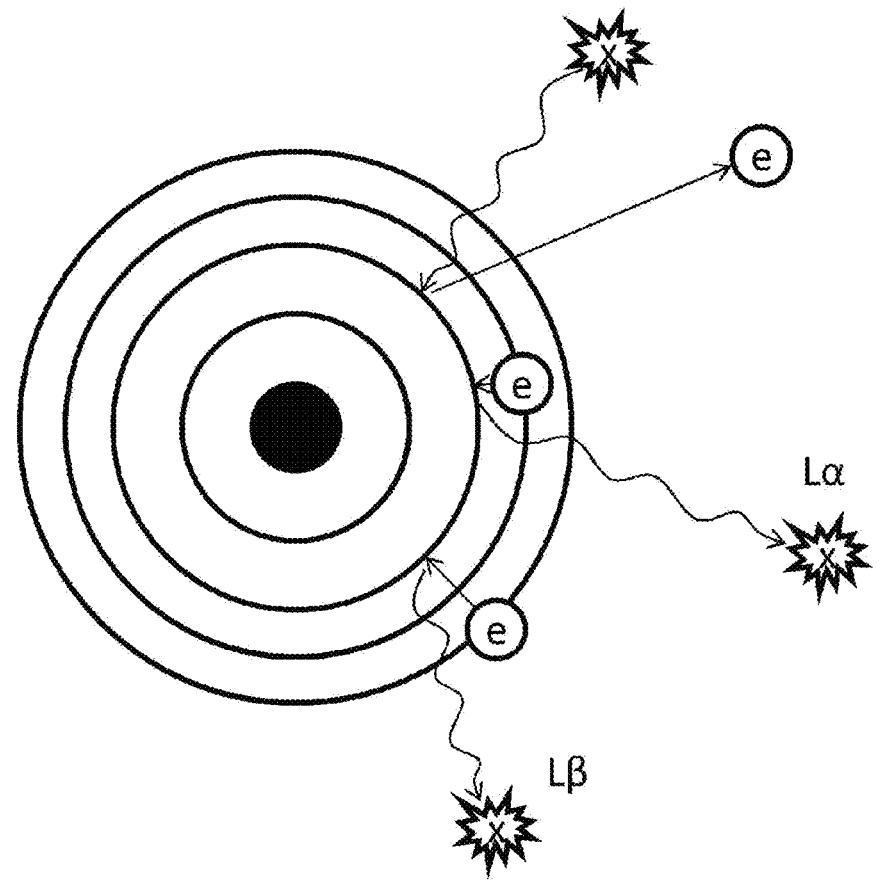
FIG. 1B schematically shows mechanisms of XRF.
Figure 2:
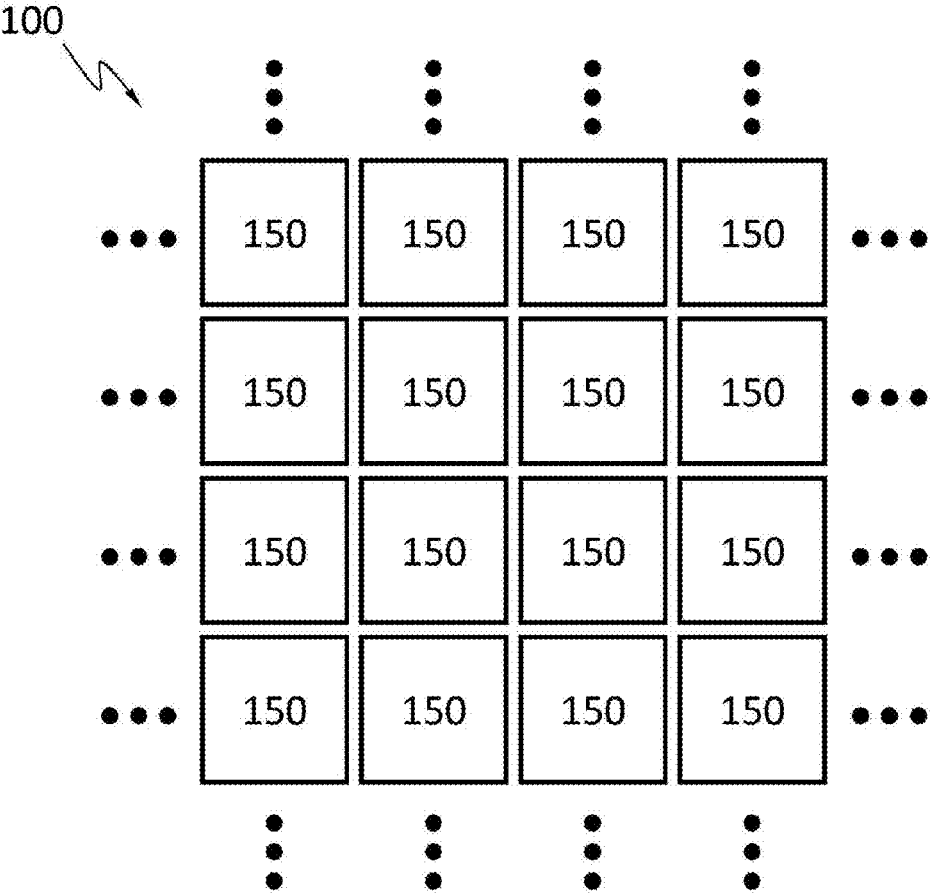
FIG. 2 schematically shows a detector suitable for XRF, according to an embodiment.

FIG. 2 schematically shows a detector 100 suitable for XRF, according to an embodiment. The detector has an array of pixels 150. The array may be a rectangular array, a honeycomb array, a hexagonal array or any other suitable array. Each pixel 150 is configured to detect an X-ray photon incident thereon and measure the energy of the X-ray photon. For example, each pixel 150 is configured to count numbers of X-ray photons incident thereon whose energy falls in a plurality of bins, within a period of time. All the pixels 150 may be configured to count the numbers of X-ray photons incident thereon within a plurality of bins of energy within the same period of time. Each pixel 150 may have its own analog-to-digital converter (ADC) configured to digitize an analog signal representing the energy of an incident X-ray photon into a digital signal. For XRF applications, an ADC with a 10-bit resolution or higher is useful. Each pixel 150 may be configured to measure its dark current, such as before or concurrently with each X-ray photon incident thereon. Each pixel 150 may be configured to deduct the contribution of the dark current from the energy of the X-ray photon incident thereon. The pixels 150 may be configured to operate in parallel. For example, when one pixel 150 measures an incident X-ray photon, another pixel 150 may be waiting for an X-ray photon to arrive. The pixels 150 may not have to be individually addressable.

The detector 100 may have at least 100, 2500, 10000, or more pixels 150. The detector 100 may be configured to add the numbers of X-ray photons for the bins of the same energy range counted by all the pixels 150. For example, the detector 100 may add the numbers the pixels 150 stored in a bin for energy from 70 KeV to 71 KeV, add the numbers the pixels 150 stored in a bin for energy from 71 KeV to 72 KeV, and so on. The detector 100 may compile the added numbers for the bins as a spectrum of the X-ray photons incident on the detector 100.

Figure 3:
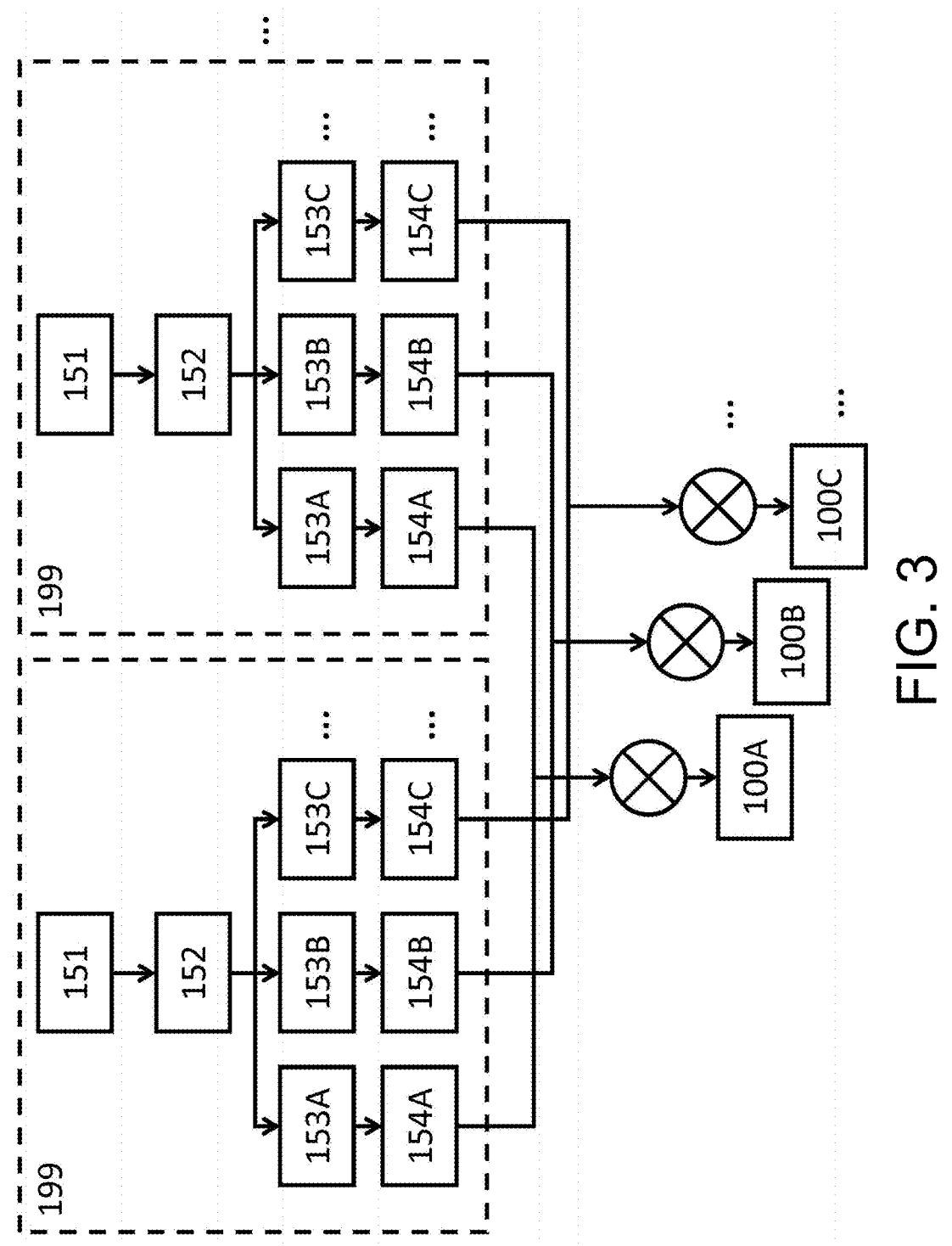
FIG. 3 schematically shows a block diagram for a detector, according to an embodiment.

FIG. 3 schematically shows a block diagram for the detector 100, according to an embodiment. Each pixel 150 may measure the energy 151 of an X-ray photon incident thereon. The energy 151 of the X-ray photon is digitized (e.g., by an ADC) in step 199 into one of a plurality of bins 153A, 153B, 153C .... The bins 153A, 153B, 153C ... each have a corresponding counter 154A, 154B and 154C, respectively. When the energy 151 is allocated into a bin, the number stored in the corresponding counter increases by one. The detector 100 may add the numbers stored in all the counters corresponding to bins for the same energy range in the pixels 150. For example, the numbers stored in all the counters 154C in all pixels 150 may be added and stored in a global counter 100C for the same energy range. The numbers stored in all the global counters may be compiled into an energy spectrum of the X-ray incident on the detector 100.

Figure 4A:
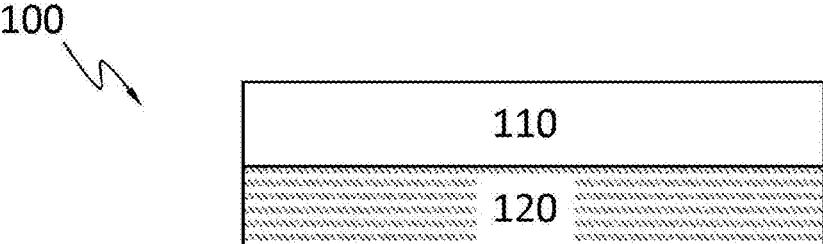
FIG. 4A schematically shows a cross-sectional view of a detector, according to an embodiment.

FIG. 4A schematically shows a cross-sectional view of the detector 100, according to an embodiment. The detector 100 may include an X-ray absorption layer 110 and an electronics layer 120 (e.g., an ASIC) for processing or analyzing electrical signals incident X-ray generates in the X-ray absorption layer 110. In an embodiment, the detector 100 does not comprise a scintillator. The X-ray absorption layer 110 may include a semiconductor material such as, silicon, germanium, GaAs, CdTe, CdZnTe, or a combination thereof. The semiconductor may have a high mass attenuation coefficient for the X-ray energy of interest.

Figure 4B:
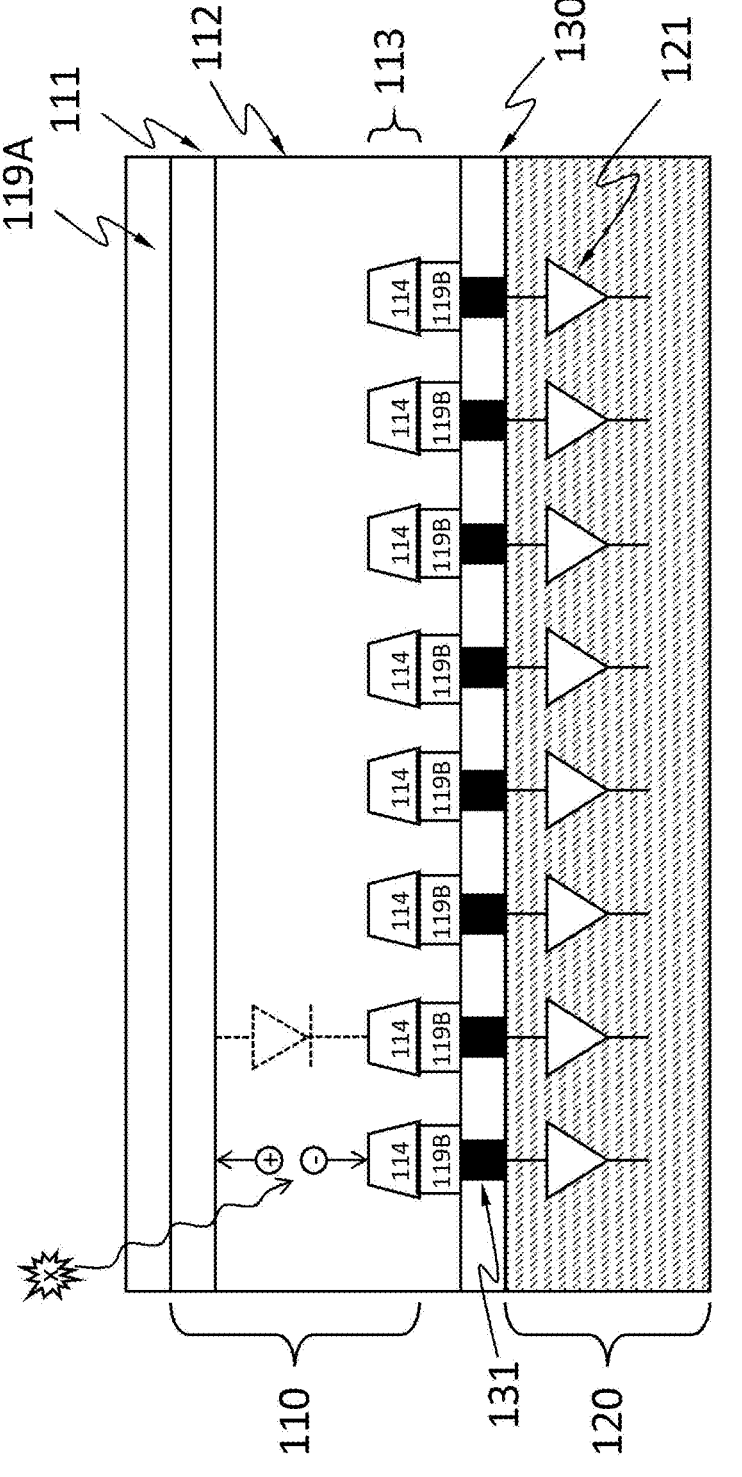
FIG. 4B schematically shows a detailed cross-sectional view of a detector, according to an embodiment.

As shown in a detailed cross-sectional view of the detector 100 in FIG. 4B, according to an embodiment, the X-ray absorption layer 110 may include one or more diodes (e.g., p-i-n or p-n) formed by a first doped region 111, one or more discrete regions 114 of a second doped region 113. The second doped region 113 may be separated from the first doped region 111 by an optional intrinsic region 112. The discrete regions 114 are separated from one another by the first doped region 111 or the intrinsic region 112. The first doped region 111 and the second doped region 113 have opposite types of doping (e.g., region 111 is p-type and region 113 is n-type, or region 111 is n-type and region 113 is p-type). In the example in FIG. 4B, each of the discrete regions 114 of the second doped region 113 forms a diode with the first doped region 111 and the optional intrinsic region 112. Namely, in the example in FIG. 4B, the X-ray absorption layer 110 has a plurality of diodes having the first doped region 111 as a shared electrode. The first doped region 111 may also have discrete portions.

When an X-ray photon hits the X-ray absorption layer 110 including diodes, the X-ray photon may be absorbed and generate one or more charge carriers by a number of mechanisms. An X-ray photon may generate 10 to 100000 charge carriers. The charge carriers may drift to the electrodes of one of the diodes under an electric field. The field may be an external electric field. The electrical contact 119B may include discrete portions each of which is in electrical contact with the discrete regions 114. In an embodiment, the charge carriers may drift in directions such that the charge carriers generated by a single X-ray photon are not substantially shared by two different discrete regions 114 ("not substantially shared" here means less than 2%, less than 0.4%, less than 0.1%, or less than 0.01% of these charge carriers flow to a different one of the discrete regions 114 than the rest of the charge carriers). Charge carriers generated by an X-ray photon incident around the footprint of one of these discrete regions 114 are not substantially shared with another of these discrete regions 114. A pixel 150 associated with a discrete region 114 may be an area around the discrete region 114 in which substantially all (more than 98%, more than 99.4%, more than 99.9%, or more than 99.99% of) charge carriers generated by an X-ray photon incident therein flow to the discrete region 114. Namely, less than 2%, less than 1%, less than 0.1%, or less than 0.01% of these charge carriers flow beyond the pixel.

Figure 4C:
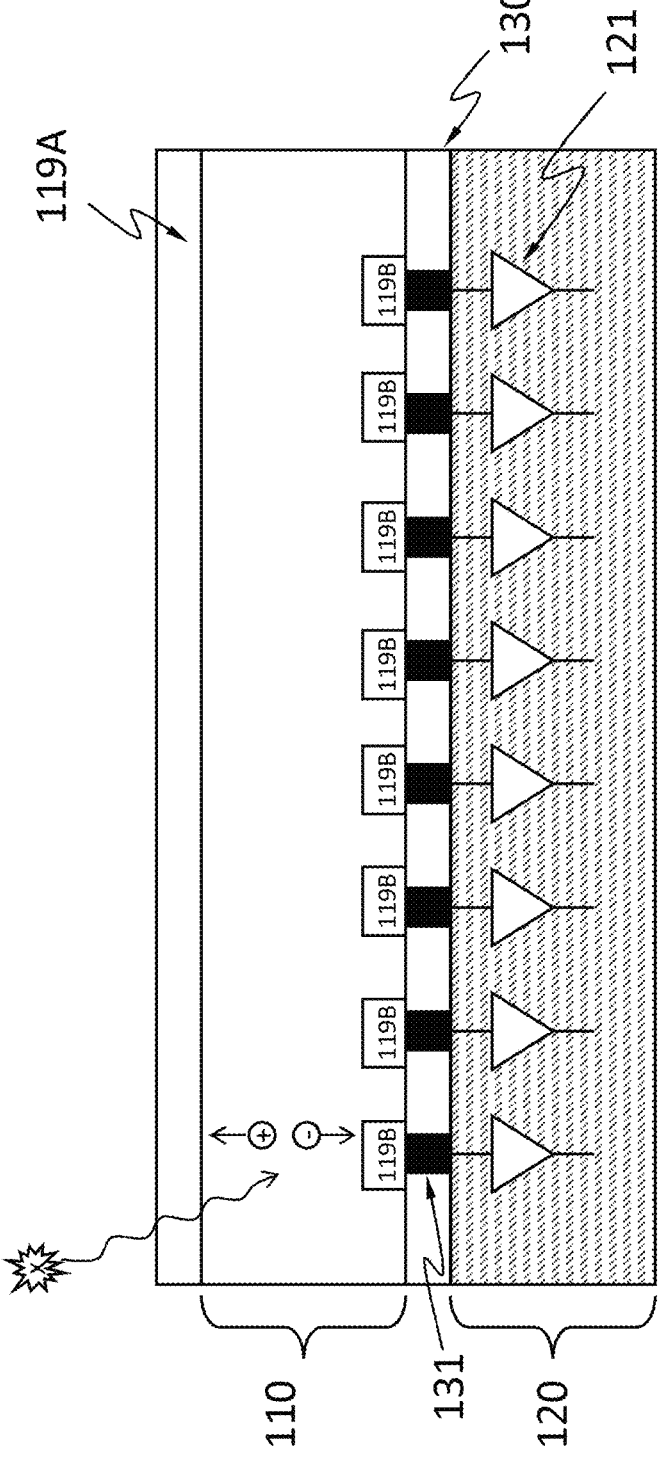
FIG. 4C schematically shows an alternative detailed cross-sectional view of the detector, according to an embodiment.

As shown in an alternative detailed cross-sectional view of the detector 100 in FIG. 4C, according to an embodiment, the X-ray absorption layer 110 may include a resistor of a semiconductor material such as, silicon, germanium, GaAs, CdTe, CdZnTe, or a combination thereof, but does not include a diode. The semiconductor may have a high mass attenuation coefficient for the X-ray energy of interest.

When an X-ray photon hits the X-ray absorption layer 110 including a resistor but not diodes, it may be absorbed and generate one or more charge carriers by a number of mechanisms. An X-ray photon may generate 10 to 100000 charge carriers. The charge carriers may drift to the electrical contacts 119A and 119B under an electric field. The field may be an external electric field. The electrical contact 119B includes discrete portions. In an embodiment, the charge carriers may drift in directions such that the charge carriers generated by a single X-ray photon are not substantially shared by two different discrete portions of the electrical contact 119B ("not substantially shared" here means less than 2%, less than 0.4%, less than 0.1%, or less than 0.01% of these charge carriers flow to a different one of the discrete portions than the rest of the charge carriers). Charge carriers generated by an X-ray photon incident around the footprint of one of these discrete portions of the electrical contact 119B are not substantially shared with another of these discrete portions of the electrical contact 119B. A pixel 150 associated with a discrete portion of the electrical contact 119B may be an area around the discrete portion in which substantially all (more than 98%, more than 99.4%, more than 99.9% or more than 99.99% of) charge carriers generated by an X-ray photon incident therein flow to the discrete portion of the electrical contact 119B. Namely, less than 2%, less than 0.4%, less than 0.1%, or less than 0.01% of these charge carriers flow beyond the pixel associated with the one discrete portion of the electrical contact 119B.

The electronics layer 120 may include an electronic system 121 suitable for processing or interpreting signals generated by X-ray photons incident on the X-ray absorption layer 110. The electronic system 121 may include an analog circuitry such as a filter network, amplifiers, integrators, and comparators, or a digital circuitry such as a microprocessor and memory. The electronic system 121 may include components shared by the pixels or components dedicated to a single pixel. For example, the electronic system 121 may include an amplifier dedicated to each pixel and a microprocessor shared among all the pixels. The electronic system 121 may be electrically connected to the pixels by vias 131. Space among the vias may be filled with a filler material 130, which may increase the mechanical stability of the connection of the electronics layer 120 to the X-ray absorption layer 110. Other bonding techniques are possible to connect the electronic system 121 to the pixels without using vias.

Figure 5A:
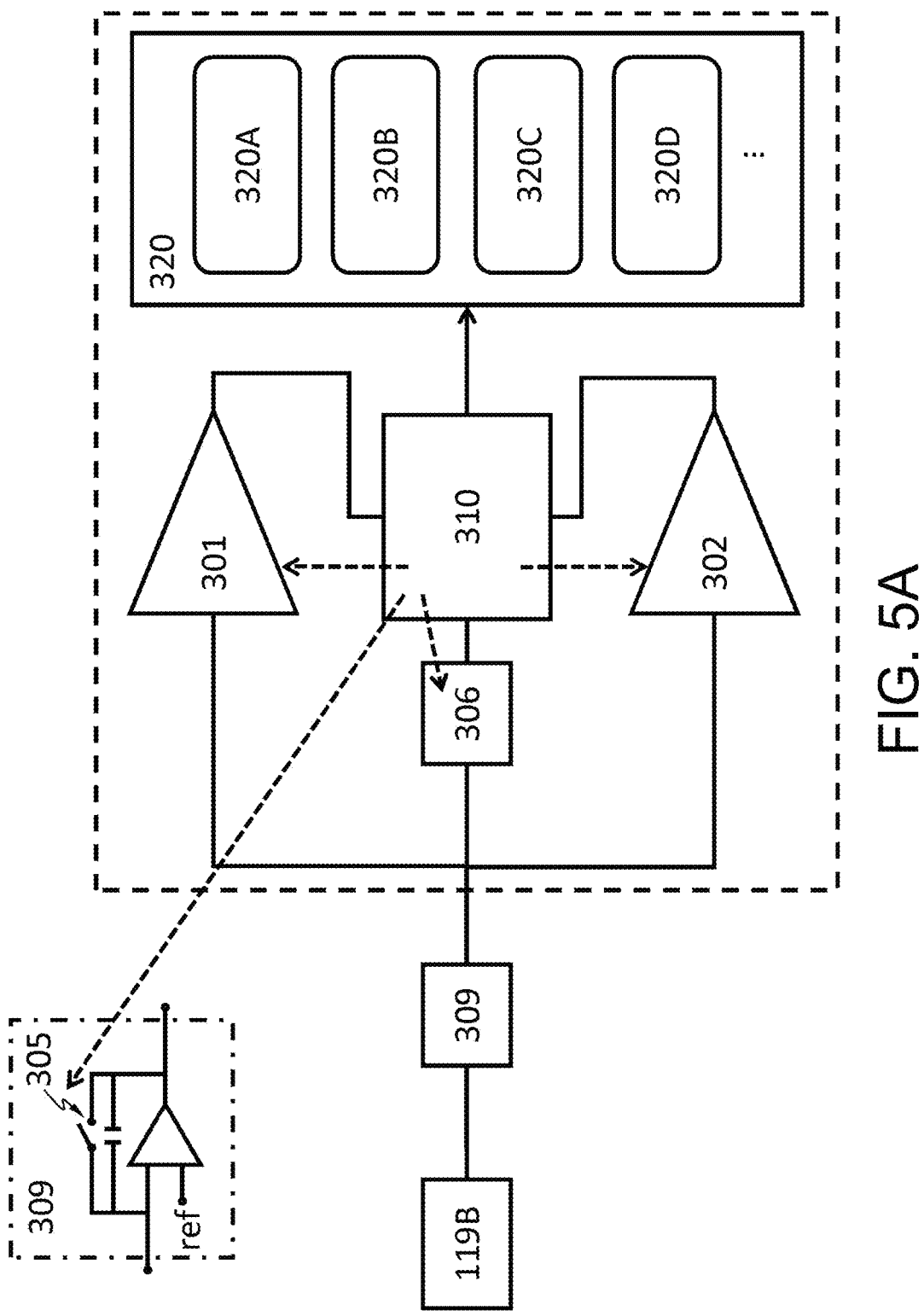
FIG. 5A shows a component diagram of an electronic system of a detector, according to an embodiment.
Figure 5B:
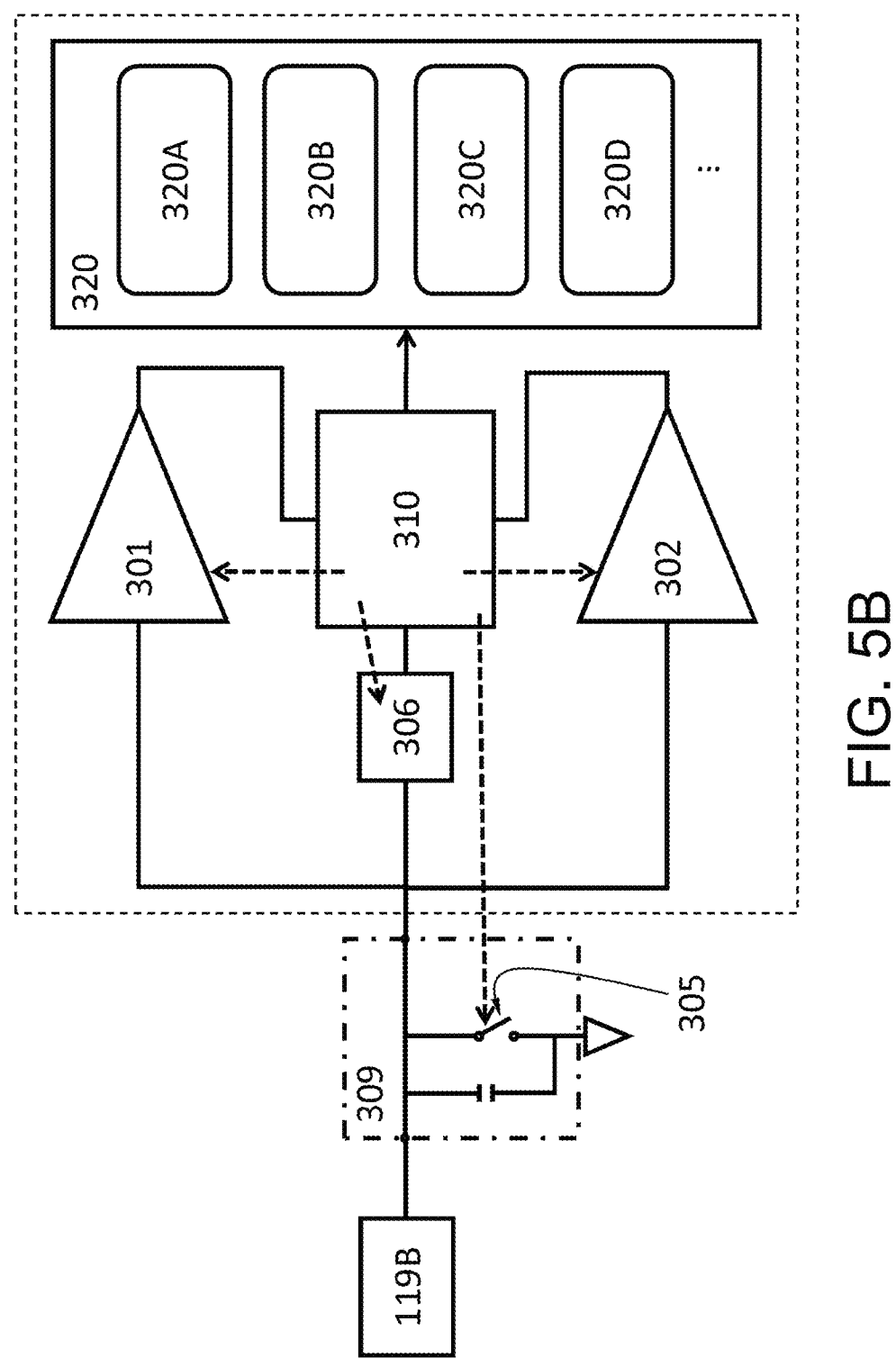
FIG. 5B shows a component diagram of an electronic system of a detector, according to an embodiment.

FIG. 5A and FIG. 5B each show a component diagram of the electronic system 121, according to an embodiment. The electronic system 121 may include a first voltage comparator 301, a second voltage comparator 302, a plurality of counters 320 (including counters 320A, 320B, 320C, 320D . . . ), a switch 305, an ADC 306 and a controller 310.

The first voltage comparator 301 is configured to compare the voltage of a discrete portion of the electric contact 119B to a first threshold. The first voltage comparator 301 may be configured to monitor the voltage directly, or calculate the voltage by integrating an electric current flowing through the diode or electrical contact over a period of time. The first voltage comparator 301 may be controllably activated or deactivated by the controller 310. The first voltage comparator 301 may be a continuous comparator. Namely, the first voltage comparator 301 may be configured to be activated continuously, and monitor the voltage continuously. The first voltage comparator 301 configured as a continuous comparator reduces the chance that the system 121 misses signals generated by an incident X-ray photon. The first voltage comparator 301 configured as a continuous comparator is especially suitable when the incident X-ray intensity is relatively high. The first voltage comparator 301 may be a clocked comparator, which has the benefit of lower power consumption. The first voltage comparator 301 configured as a clocked comparator may cause the system 121 to miss signals generated by some incident X-ray photons. When the incident X-ray intensity is low, the chance of missing an incident X-ray photon is low because the time interval between two successive photons is relatively long. Therefore, the first voltage comparator 301 configured as a clocked comparator is especially suitable when the incident X-ray intensity is relatively low. The first threshold may be 1-4%, 4-10%, 10%-20%, 20-30%, 30-40% or 40-50% of the maximum voltage one incident X-ray photon may generate on the electric contact 119B. The maximum voltage may depend on the energy of the incident X-ray photon (i.e., the wavelength of the incident X-ray), the material of the X-ray absorption layer 110, and other factors. For example, the first threshold may be 50 mV, 100 mV, 150 mV, or 199 mV.

The second voltage comparator 302 is configured to compare the voltage to a second threshold. The second voltage comparator 302 may be configured to monitor the voltage directly, or calculate the voltage by integrating an electric current flowing through the diode or the electrical contact over a period of time. The second voltage comparator 302 may be a continuous comparator. The second voltage comparator 302 may be controllably activated or deactivated by the controller 310. When the second voltage comparator 302 is deactivated, the power consumption of the second voltage comparator 302 may be less than 1%, less than 4%, less than 10% or less than 20% of the power consumption when the second voltage comparator 302 is activated. The absolute value of the second threshold is greater than the absolute value of the first threshold. As used herein, the term "absolute value" or "modulus" |x| of a real number x is the non-negative value of x without regard to its sign. Namely, $$|x| = \begin{cases} x, & \text{if } x \geq 0 \\ -x, & \text{if } x \leq 0 \end{cases}.$$

The second threshold may be 199%-300% of the first threshold. For example, the second threshold may be 100 mV, 150 mV, 199 mV, 250 mV or 300 mV. The second voltage comparator 302 and the first voltage comparator 301 may be the same component. Namely, the system 121 may have one voltage comparator that can compare a voltage with two different thresholds at different times.

The first voltage comparator 301 or the second voltage comparator 302 may include one or more op-amps or any other suitable circuitry. The first voltage comparator 301 or the second voltage comparator 302 may have a high speed to allow the system 121 to operate under a high flux of incident X-ray. However, having a high speed is often at the cost of power consumption.

The counters 320 may be a software component (e.g., numbers stored in a computer memory) or a hardware component (e.g., 4017 IC and 7490 IC). Each counter 320 is associated with a bin for an energy range. For example, counter 320A may be associated with a bin for 70-71 KeV, counter 320B may be associated with a bin for 71-72 KeV, counter 320C may be associated with a bin for 72-73 KeV, counter 320D may be associated with a bin for 73-74 KeV. When the energy of an incident X-ray photon is determined by the ADC 306 to be in the bin a counter 320 is associated with, the number registered in the counter 320 is increased by one.

The controller 310 may be a hardware component such as a microcontroller and a microprocessor. The controller 310 is configured to start a time delay from a time at which the first voltage comparator 301 determines that the absolute value of the voltage equals or exceeds the absolute value of the first threshold (e.g., the absolute value of the voltage increases from below the absolute value of the first threshold to a value equal to or above the absolute value of the first threshold). The absolute value is used here because the voltage may be negative or positive, depending on whether the voltage of the cathode or the anode of the diode or which electrical contact is used. The controller 310 may be configured to keep deactivated the second voltage comparator

302, the counter 320, and any other circuits the operation of the first voltage comparator 301 does not require, before the time at which the first voltage comparator 301 determines that the absolute value of the voltage equals or exceeds the absolute value of the first threshold. The time delay may expire after the voltage becomes stable, i.e., the rate of change of the voltage is substantially zero. The phrase "the rate of change is substantially zero" means that temporal change is less than 0.1%/ns. The phrase "the rate of change is substantially non-zero" means that temporal change of the voltage is at least 0.1%/ns.

The controller 310 may be configured to activate the second voltage comparator during (including the beginning and the expiration) the time delay. In an embodiment, the controller 310 is configured to activate the second voltage comparator at the beginning of the time delay. The term "activate" means causing the component to enter an operational state (e.g., by sending a signal such as a voltage pulse or a logic level, by providing power, etc.). The term "deactivate" means causing the component to enter a non-operational state (e.g., by sending a signal such as a voltage pulse or a logic level, by cut off power, etc.). The operational state may have higher power consumption (e.g., 10 times higher, 100 times higher, 999 times higher) than the non-operational state. The controller 310 itself may be deactivated until the output of the first voltage comparator 301 activates the controller 310 when the absolute value of the voltage equals or exceeds the absolute value of the first threshold.

The controller 310 may be configured to cause the number registered by one of the counters 320 to increase by one, if, during the time delay, the second voltage comparator 302 determines that the absolute value of the voltage equals or exceeds the absolute value of the second threshold, and the energy of the X-ray photon falls in the bin associated with the counter 320.

The controller 310 may be configured to cause the ADC 306 to digitize the voltage upon expiration of the time delay and determine based on the voltage which bin the energy of the X-ray photon falls in.

The controller 310 may be configured to connect the electric contact 119B to an electrical ground, so as to reset the voltage and discharge any charge carriers accumulated on the electric contact 119B. In an embodiment, the electric contact 119B is connected to an electrical ground after the expiration of the time delay. In an embodiment, the electric contact 119B is connected to an electrical ground for a finite reset time period. The controller 310 may connect the electric contact 119B to the electrical ground by controlling the switch 305. The switch may be a transistor such as a field-effect transistor (FET).

In an embodiment, the system 121 has no analog filter network (e.g., a RC network). In an embodiment, the system 121 has no analog circuitry.

The ADC 306 may feed the voltage it measures to the controller 310 as an analog or digital signal. The ADC may be a successive-approximation-register (SAR) ADC (also called successive approximation ADC). An SAR ADC digitizes an analog signal via a binary search through all possible quantization levels before finally converging upon a digital output for the analog signal. An SAR ADC may have four main subcircuits: a sample and hold circuit to acquire the input voltage (Vin), an internal digital-analog converter (DAC) configured to supply an analog voltage comparator with an analog voltage equal to the digital code output of the successive approximation register (SAR), the analog voltage comparator that compares Vin to the output of the internal DAC and outputs the result of the comparison to the SAR, the SAR configured to supply an approximate digital code of Vin to the internal DAC. The SAR may be initialized so that the most significant bit (MSB) is equal to a digital 1. This code is fed into the internal DAC, which then supplies the analog equivalent of this digital code (Vref/2) into the comparator for comparison with Vin. If this analog voltage exceeds Vin the comparator causes the SAR to reset this bit; otherwise, the bit is left a 1. Then the next bit of the SAR is set to 1 and the same test is done, continuing this binary search until every bit in the SAR has been tested. The resulting code is the digital approximation of Vin and is finally output by the SAR at the end of the digitization.

Figure 6:
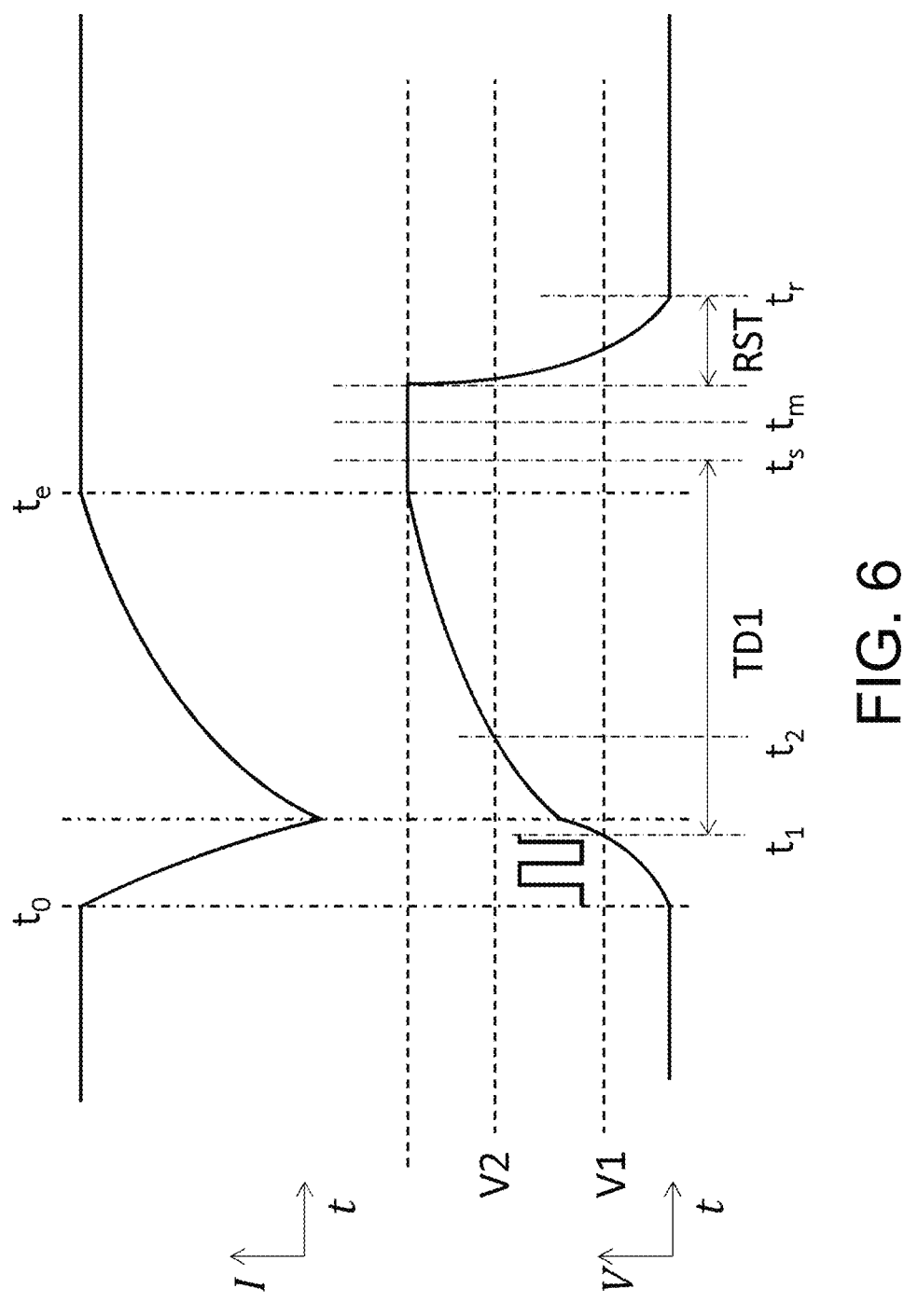
FIG. 6 schematically shows a temporal change of an electric current flowing through an electric contact (upper curve) caused by charge carriers generated by an X-ray photon incident on a pixel associated with the electric contact, and a corresponding temporal change of a voltage of the electric contact (lower curve).

The system 121 may include a capacitor module 309 electrically connected to the electric contact 119B, wherein the capacitor module is configured to collect charge carriers from the electric contact 119B. The capacitor module can include a capacitor in the feedback path of an amplifier. The amplifier configured as such is called a capacitive transimpedance amplifier (CTIA). CTIA has high dynamic range by keeping the amplifier from saturating and improves the signal-to-noise ratio by limiting the bandwidth in the signal path. Charge carriers from the electrode accumulate on the capacitor over a period of time ("integration period") (e.g., as shown in FIG. 6, between tS to t0). After the integration period has expired, the capacitor voltage is sampled by the ADC 306 and then reset by a reset switch. The capacitor module 309 can include a capacitor directly connected to the electric contact 119B.

FIG. 6 schematically shows a temporal change of the electric current flowing through the electric contact 119B (upper curve) caused by charge carriers generated by an X-ray photon incident on the pixel 150 associated with the electric contact 119B, and a corresponding temporal change of the voltage of the electric contact 119B (lower curve). The voltage may be an integral of the electric current with respect to time. At time t0, the X-ray photon hits the diode or the resistor, charge carriers start being generated in the pixel 150, electric current starts to flow through the electric contact 119B, and the absolute value of the voltage of the electric contact 119B starts to increase. At time t1, the first voltage comparator 301 determines that the absolute value of the voltage equals or exceeds the absolute value of the first threshold V1, and the controller 310 starts the time delay TD1 and the controller 310 may deactivate the first voltage comparator 301 at the beginning of TD1. If the controller 310 is deactivated before t1, the controller 310 is activated at t1. During TD1, the controller 310 activates the second voltage comparator 302. The term "during" a time delay as used here means the beginning and the expiration (i.e., the end) and any time in between. For example, the controller 310 may activate the second voltage comparator 302 at the expiration of TD1. If during TD1, the second voltage comparator 302 determines that the absolute value of the voltage equals or exceeds the absolute value of the second threshold at time t2, the controller 310 waits for stabilization of the voltage to stabilize. The voltage stabilizes at time te, when all charge carriers generated by the X-ray photon drift out of the X-ray absorption layer 110. At time ts, the time delay TD1 expires. At or after time te, the controller 310 causes the ADC 306 to digitize the voltage and determines which bin the energy of the X-ray photons falls in. The controller 310 then causes the number registered by the counter 320 corresponding to the bin to increase by one. In the example of FIG. 6, time ts is after time te; namely TD1 expires after all charge carriers generated by the X-ray photon drift out of the X-ray absorption layer 110. If time te cannot be easily measured, TD1 can be empirically chosen to allow sufficient time to collect essentially all charge carriers generated by an X-ray photon but not too long to risk have another incident X-ray photon. Namely, TD1 can be empirically chosen so that time ts is empirically after time te. Time ts is not necessarily after time te because the controller 310 may disregard TD1 once V2 is reached and wait for time te. The rate of change of the difference between the voltage and the contribution to the voltage by the dark current is thus substantially zero at te. The controller 310 may be configured to deactivate the second voltage comparator 302 at expiration of TD1 or at t2, or any time in between.

The voltage at time te is proportional to the amount of charge carriers generated by the X-ray photon, which relates to the energy of the X-ray photon. The controller 310 may be configured to determine the bin the energy of the X-ray photon falls in, based on the output of the ADC 306.

After TD1 expires or digitization by the ADC 306, whichever later, the controller 310 connects the electric contact 119B to an electric ground for a reset period RST to allow charge carriers accumulated on the electric contact 119B to flow to the ground and reset the voltage. After RST, the system 121 is ready to detect another incident X-ray photon. Implicitly, the rate of incident X-ray photons the system 121 can handle in the example of FIG. 6 is limited by 1/(TD1+RST). If the first voltage comparator 301 has been deactivated, the controller 310 can activate it at any time before RST expires. If the controller 310 has been deactivated, it may be activated before RST expires.

Because the detector 100 has many pixels 150 that may operate in parallel, the detector can handle much higher rate of incident X-ray photons. This is because the rate of incidence on a particular pixel 150 is 1/N of the rate of incidence on the entire array of pixels, where N is the number of pixels.

Figure 7:
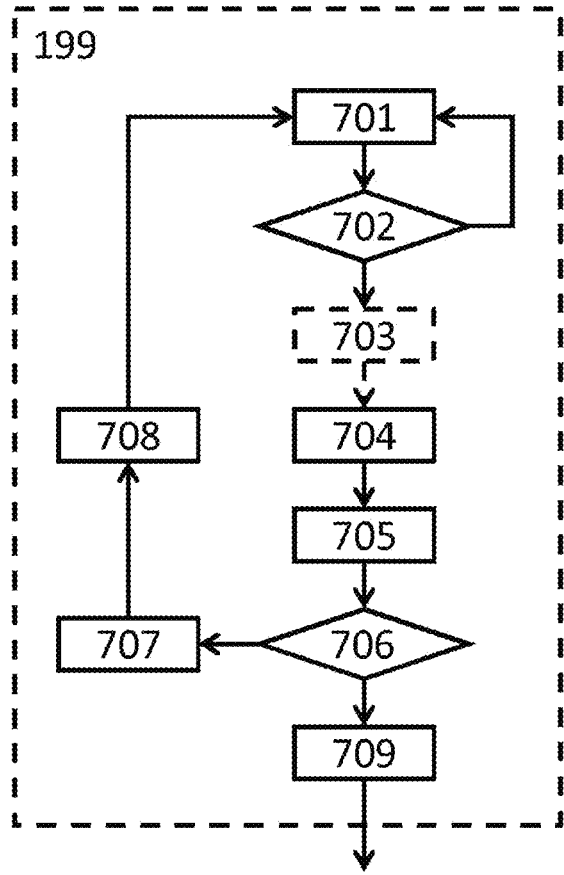
FIG. 7 shows an example flow chart for step 199 in FIG. 3, according to an embodiment.
Figure 8:
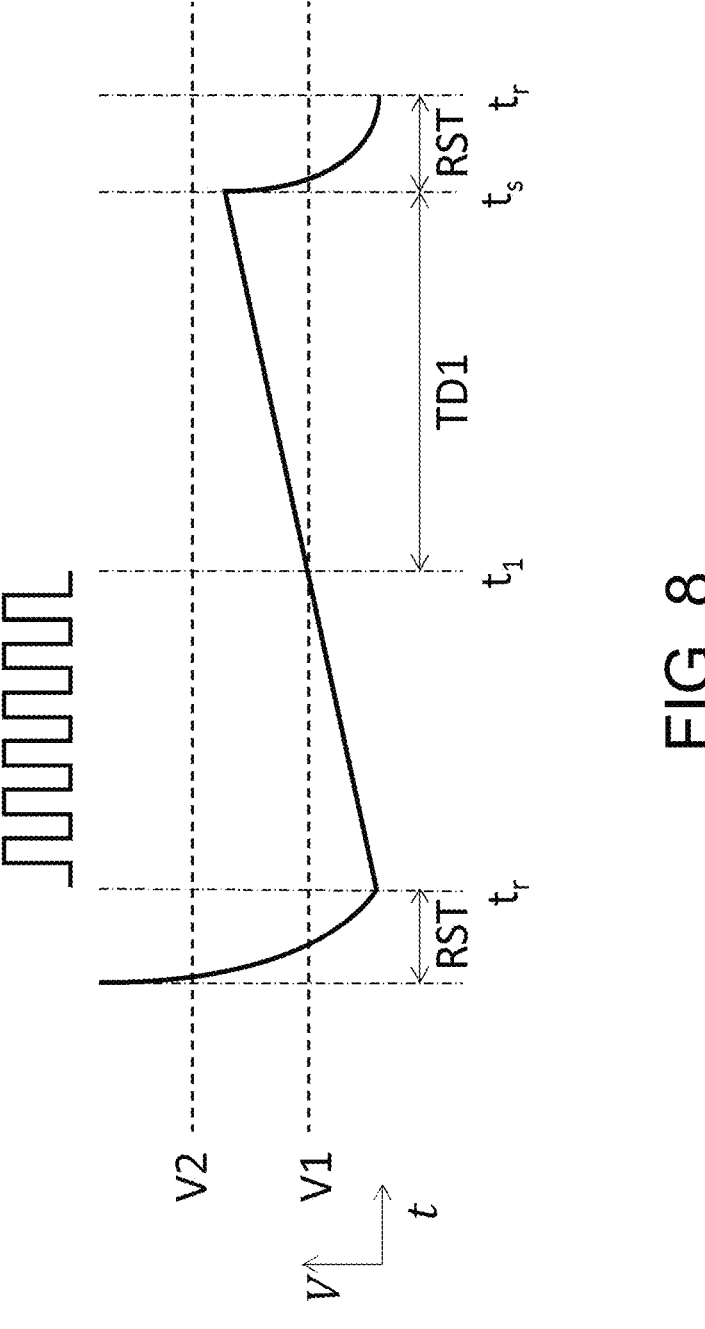
FIG. 8 schematically shows a temporal change of the voltage of the electric contact caused by a dark current, according to an embodiment.

FIG. 7 shows an example flow chart for step 199 in FIG. 3, according to an embodiment. In step 701, compare, e.g., using the first voltage comparator 301, a voltage of an electric contact 119B of a diode or a resistor exposed to X-ray photons (e.g., fluorescent X-ray), to the first threshold. In step 702, determine, e.g., with the controller 310, whether the absolute value of the voltage equals or exceeds the absolute value of the first threshold V1. If the absolute value of the voltage does not equal or exceed the absolute value of the first threshold, the method goes back to step 701. If the absolute value of the voltage equals or exceeds the absolute value of the first threshold, continue to step 703. In step 703, measure T=(t1−t0). In step 704, start, e.g., using the controller 310, the time delay TD1. In step 705, compare, e.g., using the second voltage comparator 302, the voltage to the second threshold. In step 706, determine, e.g., using the controller 310, whether the absolute value of the voltage equals or exceeds the absolute value of the second threshold V2. If the absolute value of the voltage does not equal or exceed the absolute value of the second threshold, the method goes to step 707. In step 707, measure the contribution of the dark current to the voltage using T. In an example, determine whether T is greater than the largest T previously measured (Tmax). Tmax=0 if T is not previously measured. If T is greater than Tmax, replace Tmax with T (i.e., T becomes the new Tmax). The contribution of the dark current to the voltage is at a rate of V1/Tmax. If the dark current is measured as in this example, the contribution of the dark current in step 709 is ((tm−tr)·V1/Tmax), where tr is the end of the last reset period. (tm−tr), like any time intervals in this disclosure, can be measured by counting pulses (e.g., counting clock cycles or clock pulses). Tmax may be reset to zero before each measurement with the detector 100. T may be measured by counting the number of pulses between t1 and t0, as schematically shown in FIG. 6 and FIG. 8. Another way to measure the contribution of the dark current to the voltage using T includes extracting a parameter of the distribution of T (e.g., the expected value of T (Texpected)) and estimate the rate of the contribution of the dark current to the voltage as V1/Texpected. In step 708, reset the voltage to an electrical ground, e.g., by connecting the electric contact 119B to an electrical ground. If the absolute value of the voltage equals or exceeds the absolute value of the second threshold, continue to step 709. In step 709, measure the voltage after it stabilizes, at time tm, and subtract a contribution from a dark current to the measured voltage. Time tm can be any time after TD1 expires and before RST. The result is provided to ADC in step 199 in FIG. 3. The time when the reset period ends (e.g., the time when the electric contact 119B is disconnected from the electrical ground) is tr.

FIG. 8 schematically shows a temporal change of the voltage of the electric contact 119B caused by the dark current, according to an embodiment. After RST, the voltage increases due to the dark current. The higher the dark current, the less time it takes for the voltage to reach V1 (namely shorter T). Therefore, T is a measure of the dark current. The dark current is unlikely large enough to cause the voltage to reach V2 during TD1 but current caused by an incident X-ray photon is probably large enough to do so. This difference may be used to identify the effect of the dark current. The flow in FIG. 8 may be carried out in each pixel 150 as the pixel 150 measures a series of incident X-ray photons, which will allow capturing the changes of the dark current (e.g., caused by changing environment such as temperature).

Figure 9A:
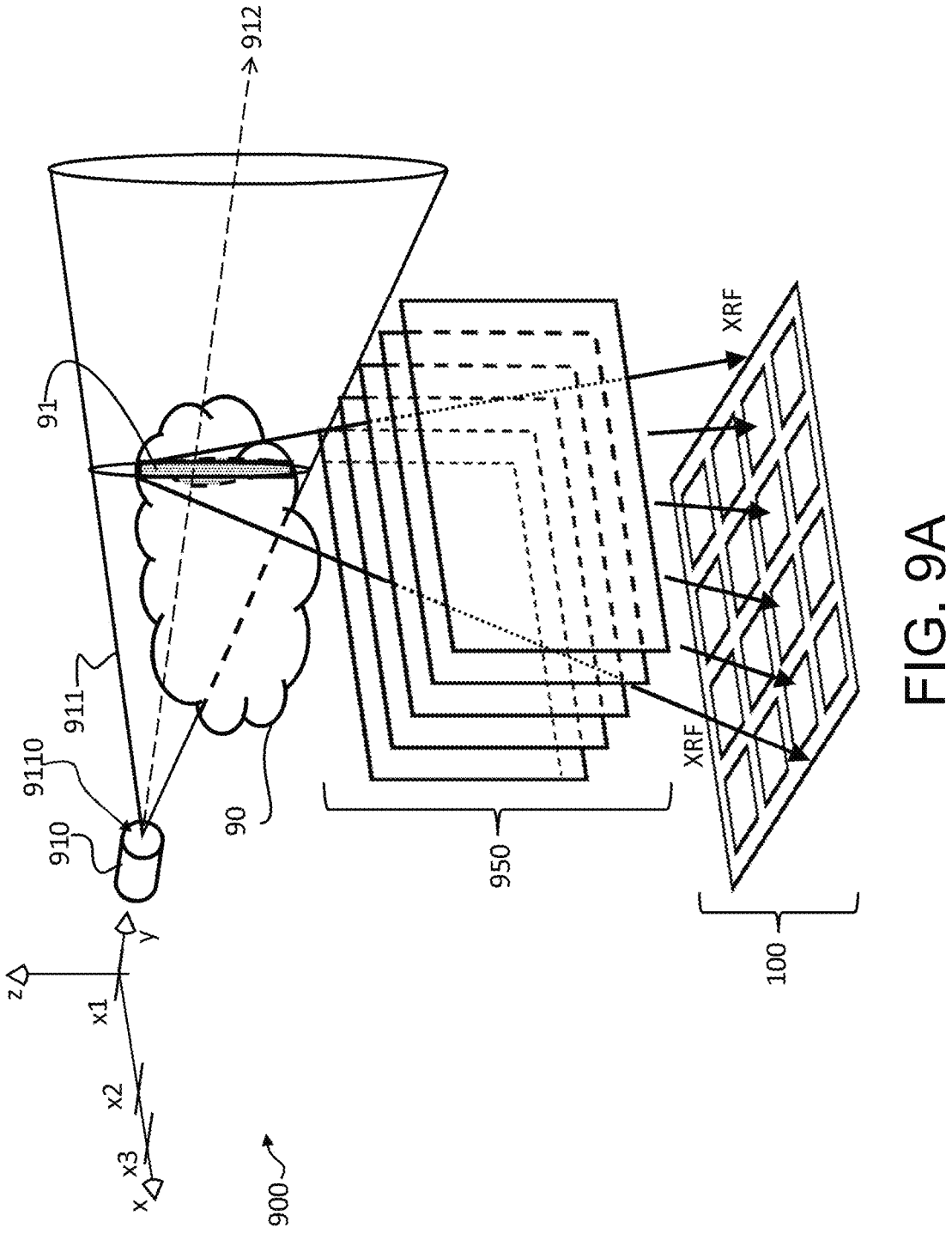
FIG. 9A schematically shows a perspective view of an apparatus according to an embodiment.

FIG. 9A schematically shows a perspective view of an apparatus 900 that includes the X-ray detector 100, a radiation source 910, and a collimator 950. In FIG. 9A, the radiation source 910 is in a first lateral position x1 where it is configured to stimulate XRF from only a first slice 91 of an object 90. The radiation source 910 is configured to emit a radiation beam 911 in a direction defined by a primary axis 912.

In FIG. 9A, the primary axis 912 is parallel to the positive-y direction, but in other embodiments, it may point in other directions. In some embodiments, the coordinate axes x, y, and z provide a reference frame for the X-ray detector 100, i.e., for convenience, the X-ray detector 100 is considered stationary with respect to the x, y, and z axes. In other embodiments, other reference frames may be used.

In some embodiments, the radiation beam 911 has significant angular divergence in one direction while having little or no angular divergence in an orthogonal direction. The radiation beam 911 in FIG. 9A may be said to be a "fan beam." The radiation beam 911 diverges significantly in a vertical plane (parallel to the y-z plane), but diverges little in a horizontal plane (parallel to the x-y plane). The first slice 91 does not include the entire object 90. Rather, the object 90 extends beyond the first slice 91 in at least one direction not parallel to the primary axis 912. In some embodiments, the radiation beam 911 is an X-ray beam. In some embodiments, the radiation beam 911 is a gamma ray beam.

According to various embodiments, the radiation beam 911 has its minimum cross-sectional area at a beam waist 9110. In various embodiments, the beam waist 9110 coincides with an aperture or a focus of the radiation source 910.

According to various embodiments, configuring the radiation source 910 to stimulate XRF from only the first slice 91 of the object 90 includes varying a distance from the radiation source 910 to the object 90 to ensure that the object 90 extends beyond the first slice 91 in at least one direction not parallel to the primary axis 912. For example, as can be seen in FIG. 9A, the object 90 extends beyond the first slice 91 in the lateral x direction.

Figure 9B:
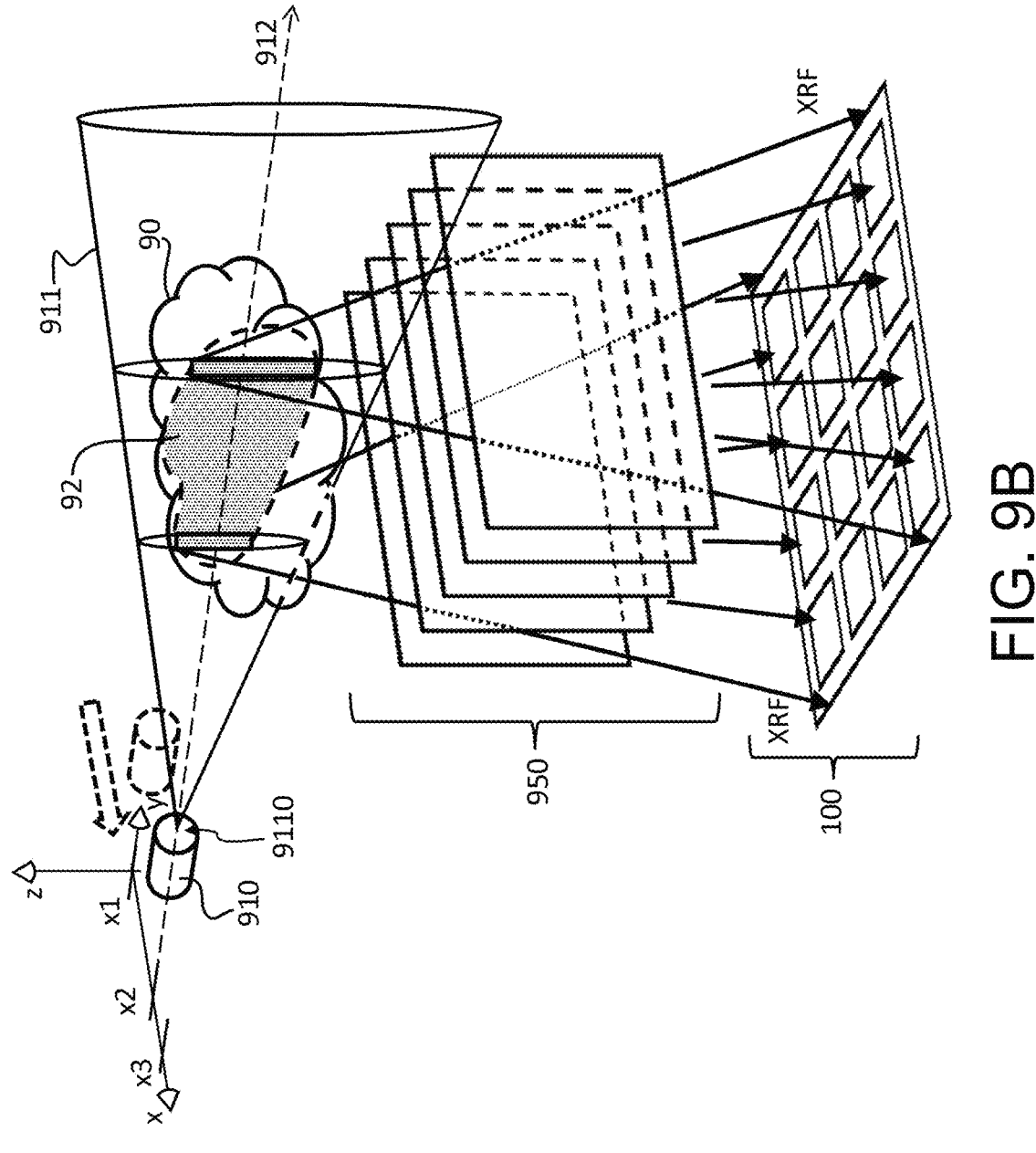
FIG. 9B schematically shows a perspective view of an apparatus according to an embodiment.

FIG. 9B schematically shows the radiation source 910 in a second lateral position x2 where it is configured to stimulate XRF from only a second slice 92 of the object 90. The second slice 92 does not include the entire object 90. Rather, the object 90 extends beyond the second slice 92 in at least one direction not parallel to the primary axis 912. For example, as can be seen in FIG. 9B, the object 90 extends beyond the second slice 92 in the lateral x direction. According to various embodiments, configuring the radiation source 910 to stimulate XRF from only the second slice 92 of the object 90 includes varying the distance from the radiation source 910 to the object 90 to ensure that the object 90 extends beyond the second slice 92 in at least one direction not parallel to the primary axis 912.

In some embodiments, the radiation beam 911 has a predetermined shape and size. In some embodiments, the shape and size of the radiation beam 911 are fixed. In other embodiments, the shape and size of the radiation beam 911 are variable. In some embodiments, the shape and size of the radiation beam 911 are adjustable in use. That is, the apparatus 900 permits the shape and size of the radiation beam 911 to be adjusted.

Figure 9C:
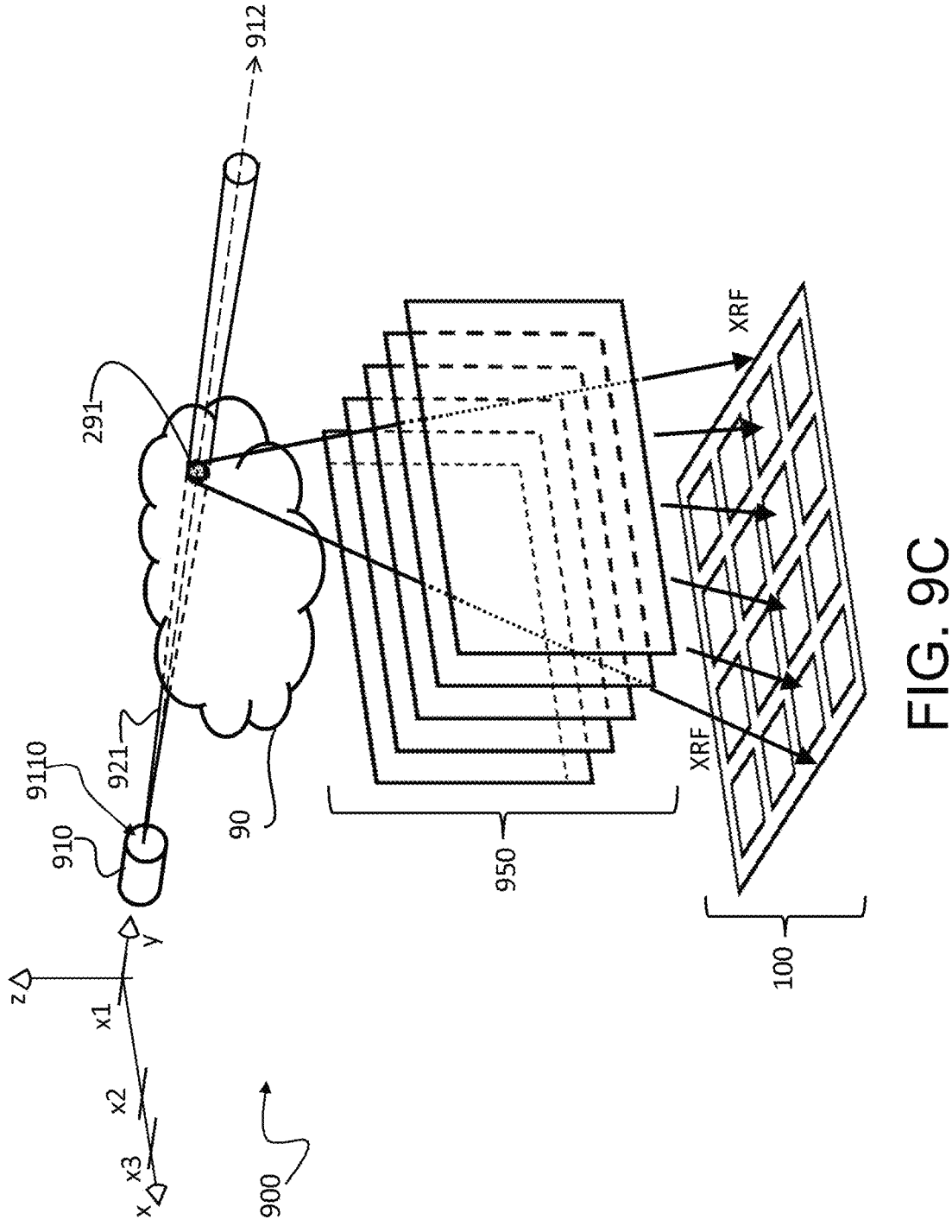
FIG. 9C schematically shows a perspective view of an apparatus according to an embodiment.

FIG. 9C schematically shows the radiation source 910 in the first lateral position x1. The radiation source 910 emits a radiation beam 921. The radiation beam 921 has little or no angular divergence in a relevant operating range of the apparatus 900. Accordingly, the radiation beam 921 may be said to be a "pencil beam." The radiation source 910 is configured to stimulate XRF from only a first slice 291 of the object 90. The first slice 291 does not include the entire object 90. Rather, the object 90 extends beyond the first slice 291 in two directions (e.g., x and z) not parallel to the primary axis 912.

Figure 9D:
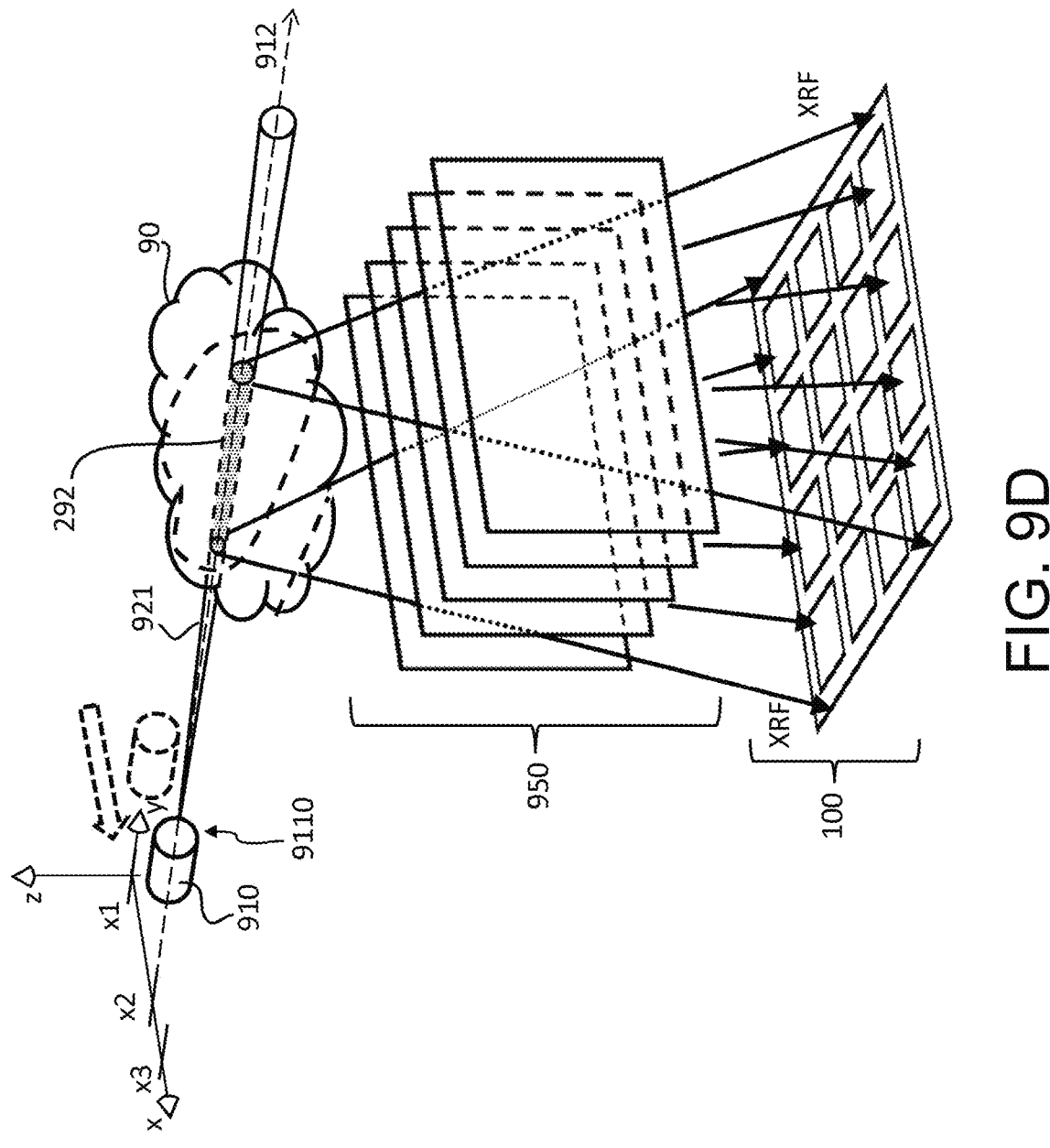
FIG. 9D schematically shows a perspective view of an apparatus according to an embodiment.

FIG. 9D schematically shows the radiation source 910 in the second lateral position x2, where it is configured to stimulate XRF from only a second slice 292 of the object 90. The second slice 292 does not include the entire object 90. Rather, the object 90 extends beyond the second slice 292 in two directions (e.g., x and z) not parallel to the primary axis 912.

According to various embodiments, using a fan beam, it is possible to generate a two-dimensional image of the object 90 by correlating a position and orientation of the radiation source 910 with positions of XRF incident on the X-ray detector 100 for each slice of the object 90. For example, as shown in FIG. 9A and FIG. 9B, a two-dimensional image including the first slice 91 and the second slice 92 can be generated based on measured lateral x positions and orientations of the radiation source 910 and based on observed y positions of the XRF that reaches the X-ray detector 100.

According to various embodiments, using a pencil beam, it is possible to generate a three-dimensional image of the object 90 by correlating a position and orientation of the radiation source 910 with positions of XRF incident on the X-ray detector 100 for each slice of the object 90. For example, as shown in FIG. 9C and FIG. 9D, a three-dimensional image including the first slice 291 and the second slice 292 can be generated based on measured lateral x and z positions and orientations of the radiation source 910 and based on observed y positions of the XRF that reaches the X-ray detector 100.

Figure 10A:
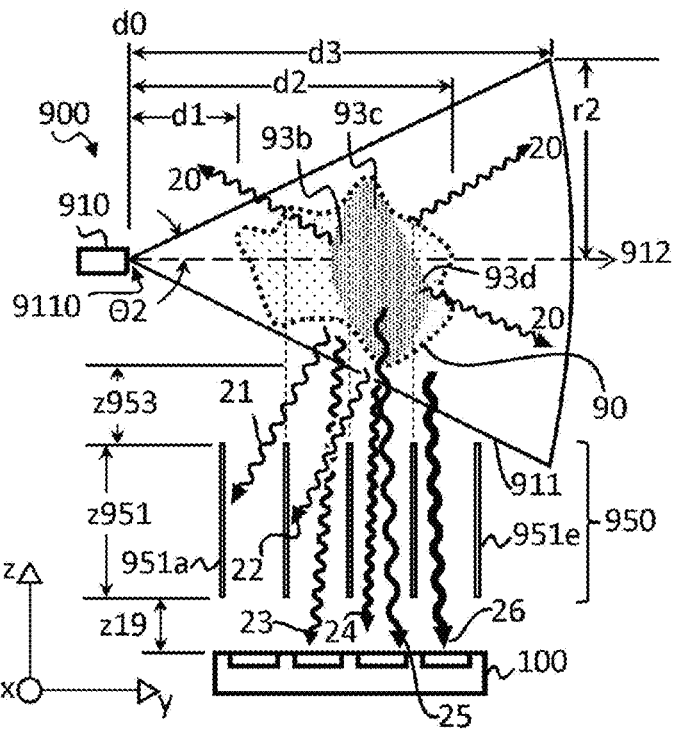
FIG. 10A schematically shows a front view of an apparatus according to an embodiment.
Figure 10B:
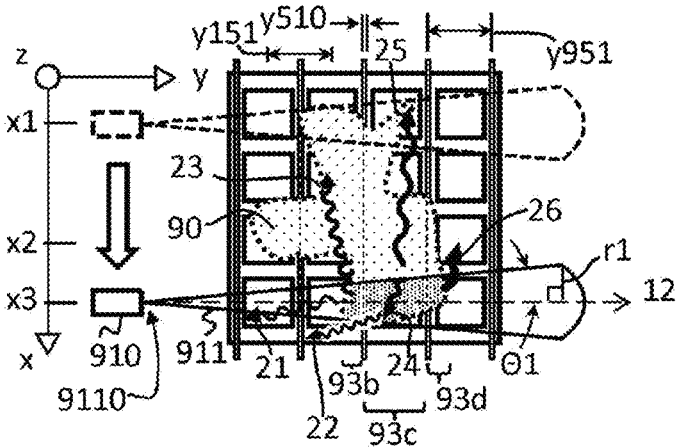
FIG. 10B schematically shows a top view of an apparatus according to an embodiment.
Figure 10C:
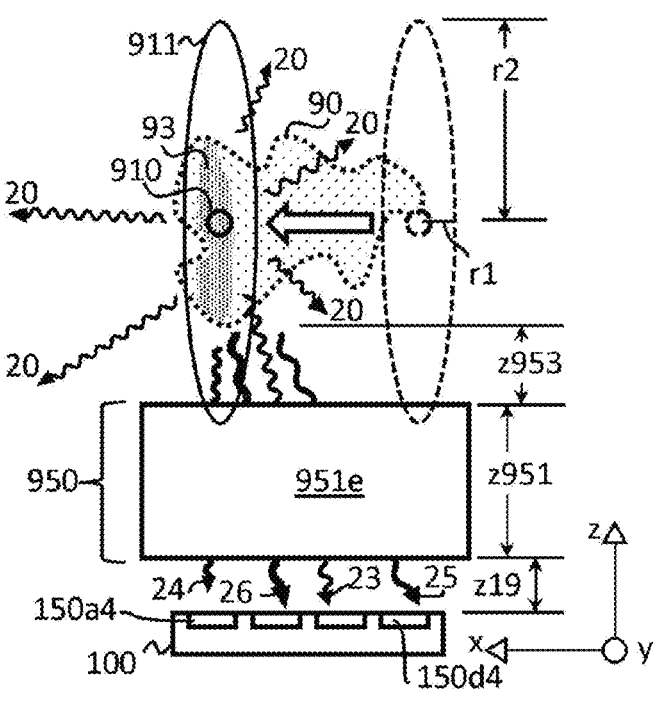
FIG. 10C schematically shows a side view of an apparatus according to an embodiment.

FIG. 10A shows a schematic front view of the apparatus 900 according to an embodiment. FIG. 10B shows a schematic top view of the apparatus 900. FIG. 10C shows a schematic right-hand side view of the apparatus 900. FIG. 10A to FIG. 10C schematically show the apparatus 900 in use to form an image of the object 90. FIG. 10A to FIG. 10C show the radiation source 910 at a third lateral position x3.

As shown in FIG. 10A and FIG. 10B, the radiation beam 911 extends into space along the primary axis 912. The radiation beam 911 has a first angular divergence @1 in a first plane and a second angular divergence Θ2 in a second plane orthogonal to the first plane. For convenience in describing exemplary embodiments, the primary axis 912 is shown parallel to the y axis, which extends in a "width" direction of the object 90. However, it will be understood that in other embodiments, the primary axis 912 may be oriented to point in a different direction, including a lateral direction, a vertical direction, or an arbitrary direction with respect to the object 90. For convenience in describing exemplary embodiments in FIG. 9A to FIG. 9D and FIG. 10A to FIG. 10D, the first angular divergence Θ1 of the radiation beam 911 is shown on a plane parallel to the x-y plane, and the first angular divergence Θ1 may be referred to as a "lateral divergence." However, it will be understood that a first direction x is not limited to a depth direction and a second direction y is not limited to the width direction. Thus, in other embodiments, the first angular divergence Θ1 may refer to a divergence in a different plane, including a vertical plane, or any other plane. Likewise, for convenience in describing non-limiting examples in FIG. 9A to FIG. 9D and FIG. 10A to FIG. 10D, the second angular divergence Θ2 is shown in a plane parallel to the y-z plane, and the second angular divergence Θ2 may be referred to as a "vertical divergence." However, it will be understood that in other embodiments, the second angular divergence Θ2 may refer to a divergence in a different plane, including a lateral plane, or any other plane.

As shown in FIG. 10A and FIG. 10B, the first angular divergence Θ1 and the second angular divergence Θ2 are each given as a divergence half-angle, i.e., the angle formed between the primary axis 912 and the asymptotic variation of a radius r of the radiation beam 911 measured from the primary axis 912. At a distance d3 measured from the beam waist 9110, the radiation beam 911 has a first radius r1 on a plane parallel to the first plane x-y and a second radius r2 on a plane parallel to the second plane y-z.

In some embodiments as shown in FIG. 9A, FIG. 9B, and FIG. 10A to FIG. 10D, at the given distance d along the primary axis 912, the first radius r1 is substantially smaller than the second radius r2. This is characteristic of the radiation beam 911 being a "fan beam."

In other embodiments, such as shown in FIG. 9C and FIG. 9D, at the given distance d along the primary axis 912, the first radius r1 is substantially equal to the second radius r2. This is characteristic of the radiation beam 921 being a "pencil beam."

According to embodiments as shown in FIG. 10A to FIG. 10D, the radiation beam 911 is laterally narrower than the object 90. When the radiation source 910 projects the radiation beam 911 through the object 90, at least one part of the object 90 falls laterally (i.e., in the x direction) outside the radiation beam 911. By contrast, the radiation beam 911 is taller than the object 90. In other words, when the radiation beam 911 is projected through the object 90, no part of the object 90 falls vertically (i.e., in the z direction) outside the radiation beam 911. In some embodiments, the radiation beam 911 projects all the way through the width of the object 90 in the y direction.

In various embodiments, the position of the radiation source 910 is variable. For example, as shown in FIG. 9A FIG. 9D, FIG. 10B, and FIG. 10C, the radiation source 910 can move by translation from the first lateral position x1 to the second lateral position x2 and to the third lateral position x3.

Figure 11A:
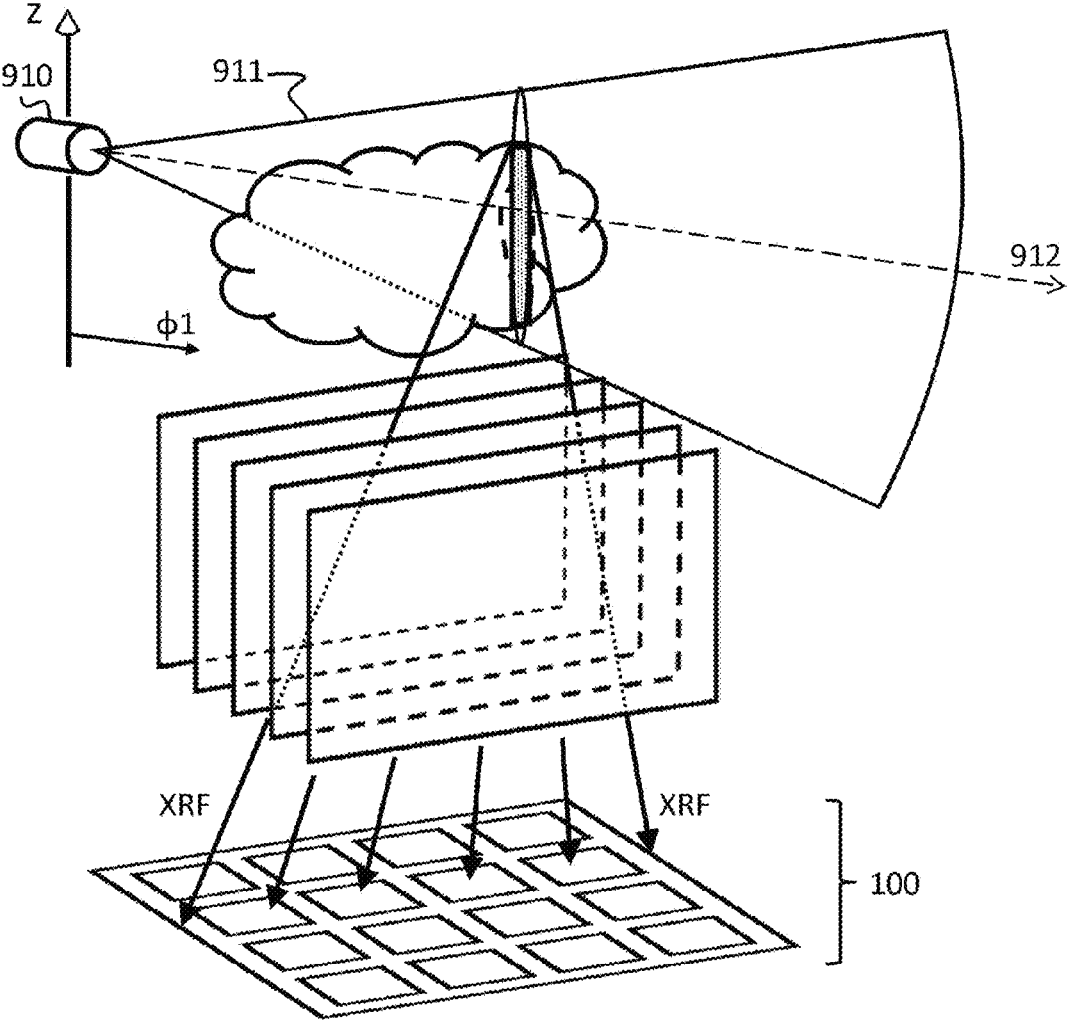
FIG. 11A schematically shows a perspective view of an apparatus according to an embodiment.
Figure 11B:
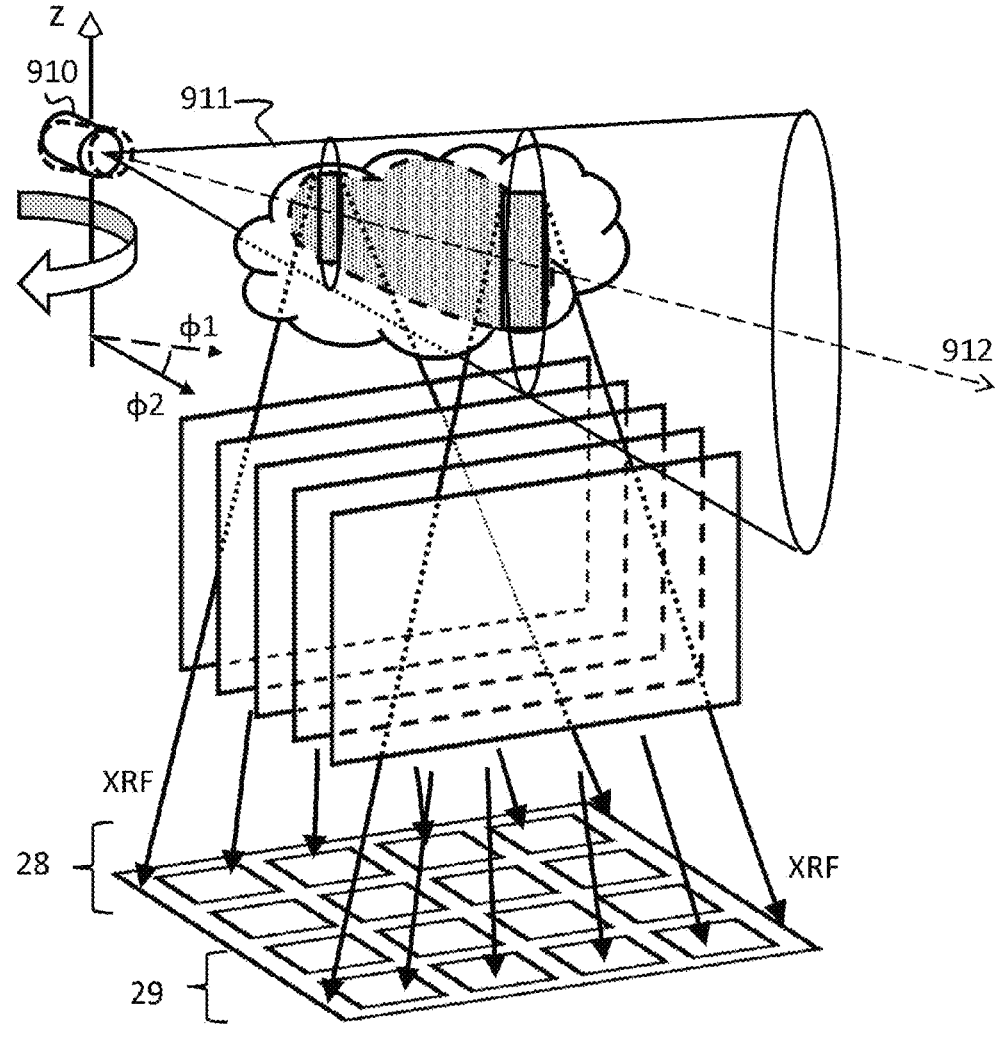
FIG. 11B schematically shows a perspective view of an apparatus according to an embodiment.

FIG. 11A schematically shows the radiation source 910 in a first orientation q1. FIG. 11B schematically shows the radiation source 910 in a second orientation q2. In various embodiments, the orientation of the radiation source 910 is variable. For example, as shown in FIG. 11A and FIG. 11B, the radiation source 910 can rotate from the first orientation q1 to the second orientation q2. In some embodiments, both a position and an orientation of the radiation source 910 are variable.

Figure 10D:
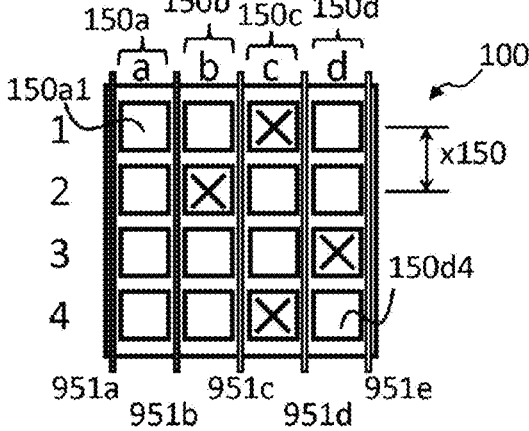
FIG. 10D schematically shows a top view of an apparatus according to an embodiment.

FIG. 10D schematically shows a top view of the apparatus 900 consistent with the top view shown in FIG. 10A. FIG. 10D more particularly shows aspects of the X-ray detector 100 and the collimator 950. The X-ray detector 100 includes a plurality of pixels 150. The pixels 150 are arranged in a two-dimensional array, with columns: a, b, c, and d; and rows: 1, 2, 3, and 4. The pixel 150 in the first row and first column may be referred to as the pixel 150a1, where "a" denotes the first column and "1" denotes the first row. Likewise, the pixel 150 in the fourth row and fourth column may be referred to as the pixel 150d4, where "d" denotes the fourth column and "4" denotes the fourth row.

As shown in FIG. 10A to FIG. 10D, the collimator 950 has a plurality of parallel collimator plates 951. In order from nearest to farthest from the radiation source 910, the plurality of parallel collimator plates 951 includes plates 951a, 951b, 951c, 951d, and 951e. Each neighboring pair of the parallel collimator plates 951 corresponds to only one subset of the pixels 150. A first neighboring pair of parallel collimator plates 951a and 951b corresponds to a first pixel subset 150a, which includes the pixels 150a1, 150a2, 150a3, and 150a4. A second neighboring pair of parallel collimator plates 951b and 951c corresponds to a second pixel subset 150b, which includes the pixels 150b1, 150b2, 150b3, and 150b4. A third neighboring pair of parallel collimator plates 951c and 951d corresponds to a third pixel subset 150c, which includes the pixels 150c1, 150c2, 150c3, and 150c4. A fourth neighboring pair of parallel collimator plates 951d and 951e corresponds to a fourth pixel subset 150d, which includes the pixels 150d1, 150d2, 150d3, and 150d4.

According to embodiments as shown in FIG. 9A, FIG. 9B, and FIG. 10A to FIG. 10D, the primary axis 912 is parallel to the y axis and the parallel collimator plates 951 are parallel to the x-z plane, such that the parallel collimator plates 951 are perpendicular to the radiation beam 911. In other embodiments, the primary axis 912 of the radiation beam 911 forms a different angle greater than or less than ninety degrees with the parallel collimator plates 951.

Still referring to embodiments as shown in FIG. 10A to FIG. 10D, each of the parallel collimator plates 951 has a vertical size or height z951 and a lateral size or thickness y510. The collimator 950 has a plate pitch y951. The parallel collimator plates 951 are distributed along the y axis and the plate pitch y951 refers to a uniform spacing between respective centers of the parallel collimator plates 951. Bottom edges of the parallel collimator plates 951 are spaced apart from the X-ray detector 100 by a distance z19. Top edges of the parallel collimator plates 951 are spaced apart from the object 90 by a distance z953.

In some embodiments, the collimator 950 includes a filler that fills all or part of at least one gap between the parallel collimator plates 951. In various embodiments, the filler is substantially transparent to X-ray, including XRF. For example, in some embodiments the filler is made of PMMA, polycarbonate, or a fiber reinforced plastic composite. In various embodiments, substantially all (more than 90%, more than 95%, more than 99%, or more than 99.9% of) XRF photons pass through the filler without being absorbed by the filler.

Still referring to embodiments as shown in FIG. 10A to FIG. 10D, the X-ray detector 100 has a pixel pitch y151 in the y direction. The pixels 150 are distributed along the y axis and the pixel pitch y151 refers to a uniform spacing between respective centers of the pixels 150.

According to some embodiments, the plate pitch y951 is an integer multiple "n" of the pixel pitch y151. For example, as shown in FIG. 10B, the plate pitch y951 is equal to the pixel pitch y151. In other words, the integer "n" equals one, such that y951=y151×1. In the y direction there is one pixel 150 per neighboring pair of the parallel collimator plates 951.

Figure 12:
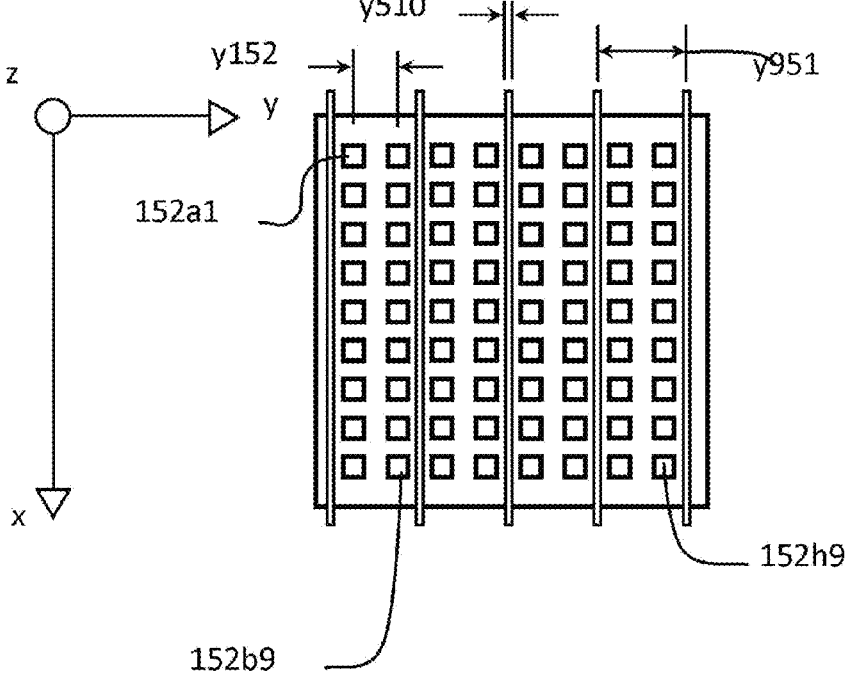
FIG. 12 schematically shows a top view of an apparatus according to an embodiment.

FIG. 12 shows another embodiment. The pixel pitch y152 is one half the plate pitch y951. In other words, in the embodiment shown in FIG. 12, the integer "n" equals two, such that y951=y152×2. In the y direction there are two pixels 152 per neighboring pair of the parallel collimator plates 951. The pixel 152 in the first row and first column may be referred to as the pixel 152a1, where "a" denotes the first column and "1" denotes the first row. Likewise, the pixel 152 in the ninth row and second column may be referred to as the pixel 152b9, where "b" denotes the second column and "9" denotes the ninth row; and the pixel 152 in the ninth row and eighth column may be referred to as the pixel 152h9, where "h" denotes the eighth column and "9" denotes the ninth row. Other embodiments have other pixel pitches, other plate pitches, and other ratios of pixels to neighboring pairs of parallel collimator plates.

According to various embodiments, the parallel collimator plates 951 contain at least one element that absorbs X-ray. In some embodiments, the parallel collimator plates 951 contain at least one element from among the group consisting of lead, tungsten, and gold.

FIG. 10A to FIG. 10C schematically show the third slice 93 of the object 90 according to an embodiment when the radiation source 910 is at the third lateral position x3. When the radiation source 910 projects the radiation beam 911 through the object 90, the radiation beam 911 causes atoms in the third slice 93 of the object 90 to emit XRF photons 20, 21, 22, 23, 24, 25, and 26. Not all the XRF photons 20, 21, 22, 23, 24, 25, and 26 reach the X-ray detector 100. For example, the XRF photons 20, 21, and 22 do not reach the X-ray detector 100. The XRF photons 20 are emitted in directions such that they do not encounter the collimator 950 and do not reach the X-ray detector 100. The XRF photon 21 is emitted in a direction such that it encounters the collimator plate 951a, where it is absorbed. The XRF photon 22 is emitted in a direction such that it encounters the collimator plate 951b, where it is absorbed.

In various embodiments, the first slice 91, the second slice 92, and the third slice 93 are defined precisely by the extent of the radiation beam 911 that penetrates the object 90 at the first position x1, at the second position x2, and at the third position x3, respectively. In other words, the size and shape of the first slice 91 correspond to the three-dimensional volume where the radiation beam 911 and the object 90 intersect when the radiation source 910 is at the first position x1. Likewise, the size and shape of the second slice 92 correspond to the three-dimensional volume where the radiation beam 911 and the object 90 intersect when the radiation source 910 is at the second lateral position x2. And the size and shape of the third slice 93 correspond to the three-dimensional volume where the radiation beam 911 and the object 90 intersect when the radiation source is at the third lateral position x3.

As shown in FIG. 10A to FIG. 10C, the XRF photons 23, 24, 25, and 26 pass between pairs of neighboring parallel collimator plates 951 to reach the X-ray detector 100. In the exemplary embodiment, no XRF photons pass between the first neighboring pair of parallel collimator plates 951a and 951b to reach the X-ray detector 100. Instead, the XRF photon 21 enters the first neighboring pair of parallel collimator plates 951a and 951b but is absorbed in the plate 951a without reaching the X-ray detector 100. By contrast, the XRF photon 23 passes between the second neighboring pair of parallel collimator plates 951b and 951c to reach the X-ray detector 100; the XRF photons 24 and 25 pass between the third neighboring pair of parallel collimator plates 951c and 951d to reach the X-ray detector 100; and the XRF photon 26 passes between the fourth neighboring pair of parallel collimator plates 951d and 951e to reach the X-ray detector 100.

As shown in FIG. 10A and FIG. 10B, when the radiation source 910 is at the third lateral position x3, the third slice 93 of the object 90 includes portions 93b, 93c, and 93d. The parallel collimator plates 951a, 951b, 951c, 951d, and 951e have the effect of virtually subdividing the third slice 93 into the portions 93b, 93c, and 93d. The first neighboring pair of parallel collimator plates 951a and 951b allows fluorescent X-ray from only a respective portion, if any, of the third slice 93 to reach the first subset 150a of the pixels 150. The second neighboring pair of parallel collimator plates 951b and 951c allows fluorescent X-ray from only a respective portion, it any, of the third slice 93 to reach the second subset 150b of the pixels 150. The third neighboring pair of parallel collimator plates 951c and 951d allows fluorescent X-ray from only a respective portion, if any, of the third slice 93 to reach the third subset 150c of the pixels 150. The fourth neighboring pair of parallel collimator plates 951d and 951e allows fluorescent X-ray from only a respective portion, if any, of the third slice 93 to reach the fourth subset 150d of the pixels 150.

In various embodiments, a slice of an object may include portions corresponding to all or less than all subsets of the pixels 150 in the X-ray detector 100. For example, a slice of the object 90 may include a portion for every one of the respective pixel subsets 150a, 150b, 150c, 150d. See, e.g., FIG. 9B. However, in other embodiments, a slice of the object 90 includes portions that correspond to only some of the pixel subsets, and not others. See, e.g., FIG. 9A and FIG. 10A to FIG. 10C. For example, due to the shape and size of the object 90, no portion of the third slice 93 corresponds to the first pixel subset 150a.

As shown in FIG. 10A to FIG. 10D, the collimator 950 prevents fluorescent X-ray emitted by the third slice 93 from reaching the first pixel subset 150a. The second neighboring pair of parallel collimator plates 951b and 951c allows fluorescent X-ray from only the second respective portion 93b of the third slice 93 to reach the second subset 150b of the pixels 150. The third neighboring pair of parallel collimator plates 951c and 951d allows fluorescent X-ray from only the third respective portion 93c to reach the third subset 150c of the pixels 150. The fourth neighboring pair of parallel collimator plates 951d and 951e allows fluorescent X-ray from only the fourth respective portion 93d to reach the fourth pixel subset 150d.

As shown in FIG. 10A to FIG. 10D, the XRF photon 21 is emitted from the second portion 93b of the third slice 93, but it does not pass between the second neighboring pair of collimator plates 951b and 951c. Instead, it encounters the plate 951a, where it is absorbed. Thus, the first neighboring pair of parallel collimator plates 951a and 951b prevents the XRF photon 21 emitted from the second portion 93b from reaching the first pixel subset 150a. This is beneficial, where it is sought for only XRF photons emitted from a first portion, if any, to be counted by the corresponding first pixel subset 150a. The XRF photon 21 is not emitted from a first portion of the third slice 93 that, if it were present, would correspond to the first pixel subset 150a. Likewise, the XRF photon 22 is emitted from the third portion 93c of the third slice 93, but it does not pass between the third neighboring pair of parallel collimator plates 951c and 951d. Instead, it encounters the plate 951b, where it is absorbed. Thus, the second neighboring pair of parallel collimator plates 951b and 951c prevents the XRF photon 22 emitted from the third portion 93c from reaching the second pixel subset 150b. This is beneficial, where it is sought for only XRF photons emitted from the second portion 93b to be counted by the corresponding second pixel subset 150b. The XRF photon 22 is not emitted from the second portion 93b, and thus, should not be counted by the second pixel subset 150b.

In various embodiments, each of the pixels 150 is configured to generate a signal whenever an X-ray photon encounters the pixel 150. Referring to FIG. 10D, a large "X" is used to indicate each position on the X-ray detector 100 where the XRF photons 23-26 are incident. The XRF photon 23 is emitted from the second portion 93b of the third slice 93, passes between the second neighboring pair of parallel collimator plates 951b and 951c, and is incident on the pixel 150b2 in the second pixel subset 150b. The XRF photon 24 is emitted from the third portion 93c of the third slice 93, passes between the third neighboring pair of parallel collimator plates 951c and 951d, and is incident on the pixel 150c4 in the third pixel subset 150c. The XRF photon 25 is emitted from the third portion 93c, passes between the third neighboring pair of parallel collimator plates 951c and 951d, and is incident on the pixel 150c1 in the third pixel subset 150c. The XRF photon 26 is emitted from the fourth portion 93d of the third slice 93, passes between the fourth neighboring pair of parallel collimator plates 951d and 951e, and is incident on the pixel 150d3 in the fourth pixel subset 150d.

In some embodiments, for each of the respective pixel subsets 150a, 150b, 150c, and 150d, the X-ray detector 100 is configured to sum signals generated in the pixel or pixels 150 of the respective subset.

Figure 10E:
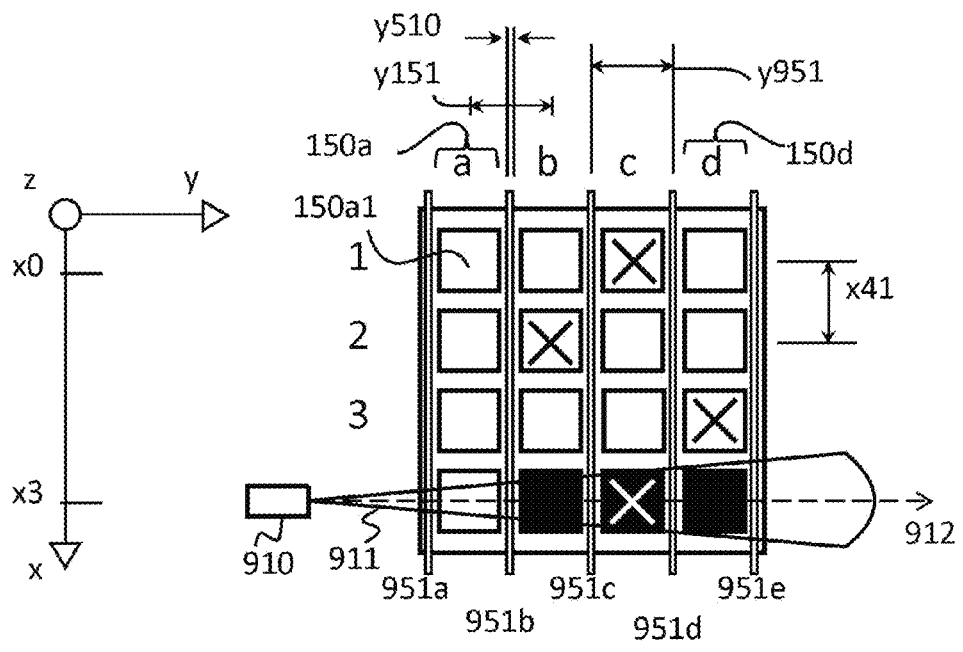
FIG. 10E schematically shows a top view of an apparatus according to an embodiment.

FIG. 10E schematically shows the radiation beam 911 in the third lateral position x3 overlaid on top of the collimator 950 and the X-ray detector 100, according to an embodiment. The large "X"'s mark the positions where the XRF photons 23-26 are incident. With the radiation beam 911 in the third lateral position x3, all the XRF photons 23-26 are emitted from only the third slice 93 of the object 90. The only XRF photon that falls on one of the pixels 150 directly below the third slice 93 (i.e., pixels 150a4, 150b4, 150c4, and 150d4) is the XRF photon 24. But the X-ray detector 100 counts more than just the XRF photon 24. As shown in FIG. 10D and FIG. 10E, even when the radiation beam 911 is in the third lateral position, the X-ray detector 100 counts all the XRF photons 23-26 that reach the pixels 150.

Accordingly, even though the XRF photons 23, 25, and 26 fall on pixels 150 that are not directly below the third slice 93 in the z direction, the apparatus 900 can resolve locations for all three portions 93b, 93c, and 93d of the third slice 93, e.g., by summing signals in the respective pixel subsets 150a, 150b, 150c, and 150d.

According to some embodiments, the apparatus 900 resolves locations for portions of slices of the object 90 in a first direction, e.g., the x direction, with the same precision as a second orthogonal direction, e.g., the y direction.

Figure 10F:
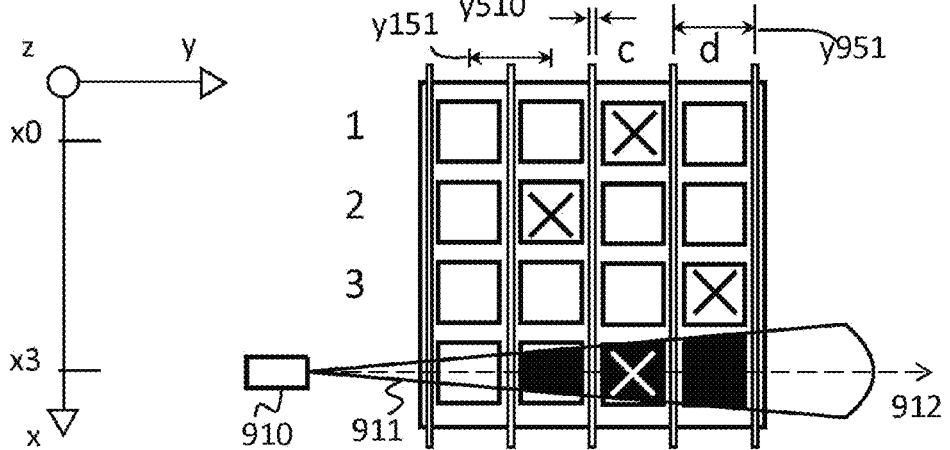
FIG. 10F schematically shows a top view of an apparatus according to an embodiment.

FIG. 10F shows the radiation beam 911 in the third lateral position x3 overlaid on top of the collimator 950 and the X-ray detector 100, according to an embodiment. The apparatus 900 of FIG. 10F resolves locations for portions of slices of the object 90 in a first direction, e.g., the x direction, to a different degree of precision as a second orthogonal direction, e.g., the y direction.

Figure 14A:
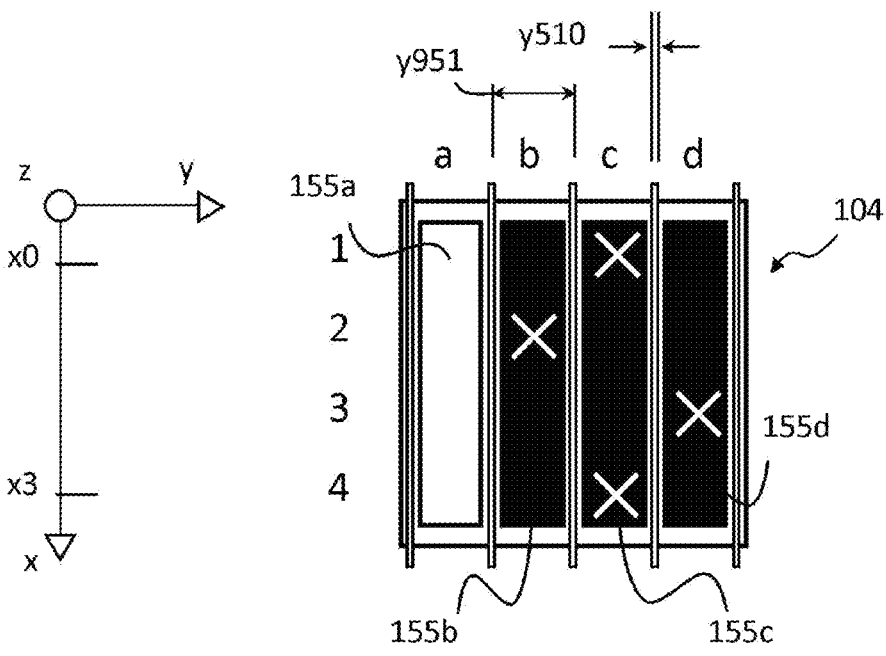
FIG. 14A schematically shows a top view of an apparatus according to an embodiment.

FIG. 14A shows a top view of the collimator 950 and an X-ray detector 104, according to an embodiment. The X-ray detector 104 has elongate pixels 155a, 155b, 155c, and 155d that occupy the same respective regions of the X-ray detector 104 as occupied by the respective pixel subsets 150a, 150b, 150c, and 150d in the X-ray detector 100. The large "X"s mark the positions where the XRF photons 23-26 are incident.

Figure 14B:
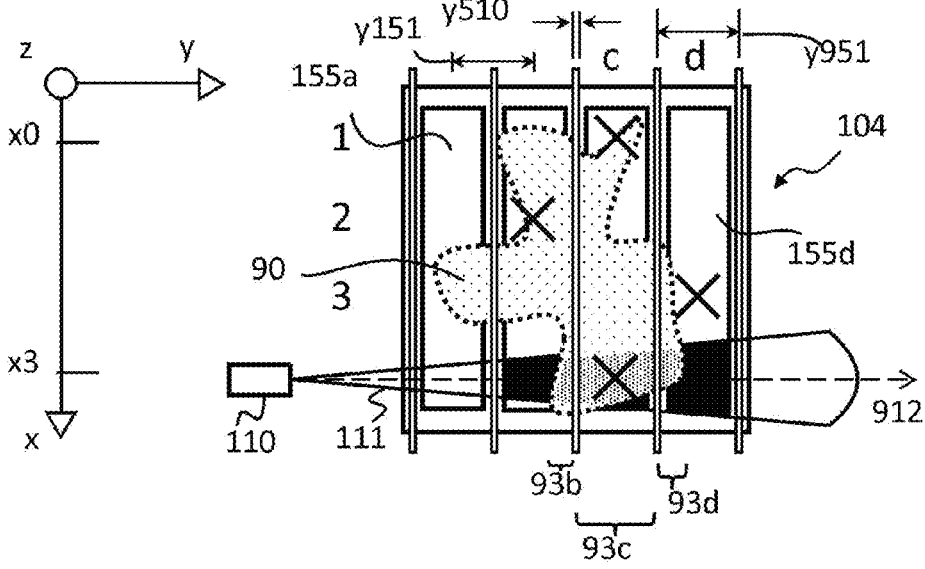
FIG. 14B schematically shows a top view of an apparatus according to an embodiment.

FIG. 14B shows the radiation beam 911 in the third lateral position x3 overlaid on top of the collimator 950 and the X-ray detector 104, according to an embodiment. By combining spatial information from the radiation beam 911 with information from the elongate pixels 155, the locations of the portions 93b, 93c, and 93d of the third slice 93 of the object 90 can be resolved.

In some embodiments, the apparatus 900 is configured to resolve features of the object 90 in a first direction—for example, in the lateral direction x-based on a width of the radiation beam 911 in the first direction.

In some embodiments, the apparatus 900 is configured to resolve features of the object 90 in a second direction—for example, in the thickness direction y-based on features of the collimator 950, such as the plate pitch y951.

In some embodiments, the apparatus 900 is configured to resolve features of the object 90 in a third direction—for example, in the height-direction z-based on a vertical size or height of the radiation beam 921 in the third direction.

In some embodiments, the collimator 950 not only filters the XRF photons 21-29, but also shields the X-ray detector 100 from direct exposure to the radiation beam 911. In some embodiments, the parallel collimator plates 951 are not parallel to the radiation beam 911. Because the parallel collimator plates 951 are not parallel to the radiation beam 911, this helps prevent the radiation beam 911 from projecting directly onto the X-ray detector 100.

In some embodiments, XRF photons have energies substantially lower than the radiation beam 911. As such, it may be desirable for the X-ray detector 100 to be particularly sensitive in a spectrum corresponding to the XRF photons. If the radiation beam 911 is permitted to project directly onto the X-ray detector 100, there is a risk that the radiation beam 911 will inundate the X-ray detector 100, resulting in unacceptable noise, making it difficult to distinguish the comparatively low-energy XRF photons that reach the X-ray detector 100.

According to various embodiments, even though the collimator plates 951 are not parallel to the radiation beam 911, there is still a chance that some amount of the radiation beam 911 might reach the X-ray detector 100. For example, the radiation beam 911 might deflect off the object 90 and then travel along a path that passes through the collimator 950 to the X-ray detector 100. According to some embodiments, the apparatus 900 is configured to distinguish radiation incident on the X-ray detector 100 by the energy or energy range of the incident radiation. For example, the apparatus 900 may be configured to filter-out signals arising from the radiation beam 911 reaching the X-ray detector.

Figure 13:
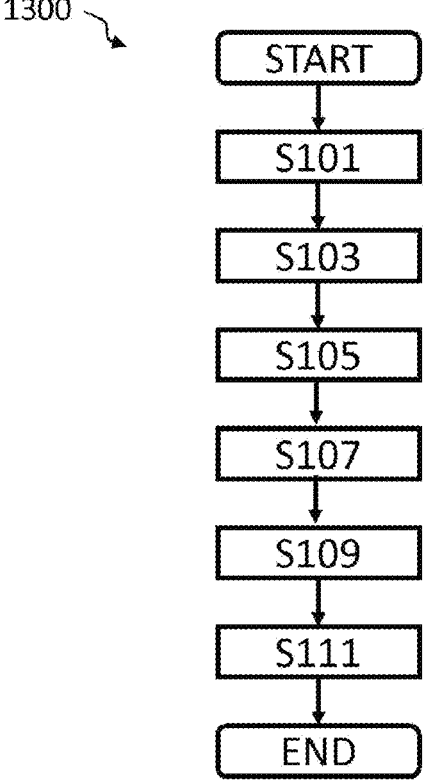
FIG. 13 schematically shows a method according to an embodiment.

FIG. 13 shows an image forming method 1300 according to an embodiment. The method 1300 includes arranging S101 the object 90 in relation to the apparatus 900 in a manner suitable for forming an image of the object 90 by detecting XRF photons emitted from the object 90. In some embodiments, a specimen fixture is provided whereby a position and/or orientation of the object 90 in relation to the apparatus 900 may be fixed, controlled, calibrated, and measured. According to various embodiments, the specimen fixture is substantially transparent to at least one of the radiation beam 911 and the XRF photons 20-26. For example, in some embodiments the specimen fixture is made of PMMA, polycarbonate, or a fiber reinforced plastic composite. In various embodiments, substantially all (more than 90%, more than 95%, more than 99%, or more than 99.9% of) XRF photons pass through the specimen fixture without being absorbed by it. In some embodiments, the arranging S101 includes locating the object 90 in the specimen fixture.

In some embodiments, the specimen fixture includes a bed and the arranging S101 includes resting the object 90 on the bed. In other embodiments, the specimen fixture includes at least one strap, clamp, clip, pin, or screw. In other embodiments, the specimen fixture includes other fasteners, devices, or structures.

Embodiments of the image forming method 1300 further include projecting S103 the radiation beam 911 through only a slice of the object 90.

Embodiments of the image forming method 1300 further include counting S105 XRF photons incident on each of a plurality of pixels 150 separated from the object 90 by a collimator 950 that includes a plurality of parallel collimator plates 951 not parallel to the radiation beam 911.

Embodiments of the image forming method 1300 further include summing S107 signals generated in respective subsets of the plurality of pixels 150.

Embodiments of the image forming method 1300 further include counting S109 numbers of the XRF photons incident on each pixel whose energy falls in a plurality of bins, within a period of time.

Embodiments of the image forming method 1300 further include adding S111 the numbers of X-ray photons for the bins of the same energy range.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus comprising:
a radiation source configured to stimulate X-ray fluorescence from only a slice of an object by projecting a radiation beam through only the slice;
an X-ray detector having a plurality of pixels; and
a collimator having a plurality of parallel collimator plates, wherein the radiation beam is not parallel to the collimator plates, wherein neighboring pairs of the collimator plates allow fluorescent X-ray from only respective portions of the slice to reach respective subsets of the pixels, and
wherein, for each of the respective pixel subsets the X-ray detector is configured to sum signals generated in the pixel or pixels of the respective subset.

2. The apparatus of claim 1, wherein the slice has a lateral size narrower than the object.

3. The apparatus of claim 1, wherein the radiation beam is an X-ray beam or a gamma ray beam.

4. The apparatus of claim 1, wherein the parallel collimator plates are spaced apart uniformly, the spacing of the parallel collimator plates being characterized by a plate pitch, and
wherein the pixels are spaced apart uniformly, the spacing of the pixels being characterized by a pixel pitch that is an integer multiple of the plate pitch.

5. The apparatus of claim 1, wherein each pixel of the plurality of pixels is configured to count numbers of X-ray photons incident thereon.

6. The apparatus of claim 5, wherein each pixel is further configured to count numbers of the X-ray photons incident thereon whose energy falls in a plurality of bins, within a period of time; and
wherein the apparatus is configured to add the numbers of X-ray photons for the bins of the same energy range.

7. The apparatus of claim 1, further comprising:
a specimen fixture to hold the object; and
the specimen fixture is substantially transparent to the radiation beam and XRF.

8. The apparatus of claim 1, wherein the parallel collimator plates contain at least one element that absorbs X-ray.

9. The apparatus of claim 8, wherein the parallel collimator plates contain at least one element from among the group consisting of lead, tungsten, and gold.

10. The apparatus of claim 8, wherein the collimator further includes
a filler that fills all or part of at least one gap between the parallel collimator plates, and
the filler is substantially transparent to X-ray.

11. An X-ray fluorescence imaging method, comprising:
providing an X-ray detector having a plurality of pixels;
projecting a radiation beam through a slice of an object to stimulate XRF from the slice; and
allowing XRF from only respective portions of the slice to reach respective subsets of the pixels by providing between the object and the X-ray detector a collimator having a plurality of parallel plates not parallel to the radiation beam, wherein each pixel of each subset of pixels is aligned to receive XRF between only one neighboring pair of the parallel plates; and
counting numbers of XRF photons incident on each pixel of the X-ray detector.

12. The method of claim 11, further comprising:
counting numbers of the XRF photons incident on each pixel whose energy falls in a plurality of bins, within a period of time; and
adding the numbers of XRF photons for the bins of the same energy range.

13. The method of claim 11, further comprising:
resolving an image of the object in a first direction orthogonal to a primary axis of the radiation beam based on a size of the slice in the first direction; and
resolving the image of the object in a second direction orthogonal to the primary axis and orthogonal to the first direction based on a size of a gap between neighboring pairs of the parallel plates.

14. The method of claim 13, further comprising:

resolving the image of the object in a third direction orthogonal to the primary axis and orthogonal to the first and second directions based on a size of the slice in the third direction.

15. The method of claim 11, further comprising:

projecting the radiation beam through a first slice of the object;

counting the numbers of XRF photons incident on each pixel of the X-ray detector from the first slice;

projecting the radiation beam through a second slice different from the first slice; and counting the numbers of XRF photons incident on each pixel of the X-ray detector from the second slice.

16. The method of claim 15, wherein the object is stationary, and the radiation beam is moved.

17. The method of claim 15, wherein the radiation beam is stationary, and the object is moved.

18. The method of claim 15, further comprising:

moving the radiation beam in a first scanning direction from a first position where the radiation beam projects through the first slice to a second position where the radiation beam projects through the second slice.

19. The method of claim 18, wherein the moving the radiation beam includes translating the radiation beam.

20. The method of claim 18, wherein the moving the radiation beam includes rotating the radiation beam.

\* \* \* \* \*